(12) United States Patent
Matsuoka et al.

(10) Patent No.: US 8,009,977 B2
(45) Date of Patent: Aug. 30, 2011

(54) ON-VEHICLE LIGHTING APPARATUS

(75) Inventors: Azusa Matsuoka, Kobe (JP); Masahiro Yamada, Kobi (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 12/662,473

(22) Filed: Apr. 19, 2010

(65) Prior Publication Data
US 2010/0290774 A1 Nov. 18, 2010

(30) Foreign Application Priority Data
May 14, 2009 (JP) ................................. 2009-117672

(51) Int. Cl.
*G03B 15/03* (2006.01)
*B60Q 3/04* (2006.01)
(52) U.S. Cl. ........................................ 396/155; 362/543
(58) Field of Classification Search .................. 396/155; 362/543
See application file for complete search history.

(56) References Cited

U.S. PATENT DOCUMENTS
| | | | | |
|---|---|---|---|---|
| 5,949,331 A | * | 9/1999 | Schofield et al. | 340/461 |
| 7,859,565 B2 | * | 12/2010 | Schofield et al. | 348/148 |
| 2009/0273941 A1 | * | 11/2009 | Englander et al. | 362/464 |

FOREIGN PATENT DOCUMENTS
| | | |
|---|---|---|
| JP | A-2003-40033 | 2/2003 |
| JP | A-2004-189060 | 7/2004 |
| JP | A-2005-41398 | 2/2005 |
| JP | A-2005-77130 | 3/2005 |
| JP | A-2006-54504 | 2/2006 |
| JP | A-2006-290273 | 10/2006 |
| JP | A-2006-311214 | 11/2006 |
| WO | WO00/07373 | 2/2000 |
| WO | WO00/64175 | 10/2000 |

* cited by examiner

*Primary Examiner* — Rodney Fuller
(74) *Attorney, Agent, or Firm* — Oliff & Berridge, PLC

(57) ABSTRACT

An image display system generates an image including an intended lighting area surrounding a vehicle to input it on a display. An auxiliary lighting unit can selectively light multiple divided areas into which the intended lighting area is divided. One or more divided areas to be lit out of the multiple divided areas are selected according to a lighting status of a driving lighting system and the selected one or more divided areas are lit by the auxiliary lighting unit.

13 Claims, 18 Drawing Sheets

THIRD LIGHTING PATTERN

FOURTH LIGHTING PATTERN

FIFTH LIGHTING PATTERN

SIXTH LIGHTING PATTERN

SEVENTH LIGHTING PATTERN

EIGHTH LIGHTING PATTERN

NINTH LIGHTING PATTERN

TENTH LIGHTING PATTERN

ELEVENTH LIGHTING PATTERN

ON-VEHICLE LIGHTING APPARATUS

BACKGROUND OF THE INVENTION

1. Field of the Invention

The invention relates to a technology of lighting for assisting in photographing surroundings of a vehicle.

2. Description of the Background Art

A conventionally-known image display system is of a type installed in a vehicle such as a car, photographing surroundings of the vehicle and generating their images to display on a display in a cabin of the vehicle. For example, an area outside a front fender of the vehicle which is opposite to a driver seat is often a blind corner for a driver. By using an image display system that shows photographed images of the area outside the front fender, the driver can easily see clearance between a side of the vehicle body that is opposite to the driver seat and an object in a case of going by an oncoming car on a narrow road or the like.

However, in a dark surrounding environment, such as at night, light exposure is insufficient for such an image display system to take photographs so that images of the surroundings of the vehicle cannot be displayed with enough brightness. Therefore, Japanese Patent No. JP2004-189060 A discloses a technology for emitting auxiliary light to assist in photographing and lighting an area to be photographed in a relatively dark surrounding environment to ensure necessary brightness for satisfactory images.

Recently, a technology is required to display in a cabin of a vehicle not only images of a limited area surrounding the vehicle such as an area outside a front defender of the vehicle but also images of a wider area. For example, lateral areas of a vehicle are hard for a driver to see. Therefore, an image of an entire lateral area from a front space of a front end to a back space of a rear end of the vehicle is requested to be displayed in the cabin of the vehicle. For another example, as disclosed in WO Publication No. WO 00/07373 A1, in one of proposed technologies, surroundings of a vehicle are photographed by using multiple on-vehicle cameras and the photographed images are combined to generate a composite image viewed from an arbitrary virtual viewpoint such as from a top or a rear point of the vehicle, to provide the composite image to a driver.

Even in such a case where an image of a relatively wide area is displayed in a cabin of a vehicle, it is required to light an area surrounding the vehicle in a relatively dark surrounding environment. However, as an area to be photographed becomes larger, huge amounts of electricity is required to evenly and constantly light the entire area that needs lighting for photographing, which may lead to shorter durability of a light source providing light because of degradation of the light source.

SUMMARY OF THE INVENTION

According to one aspect of the invention, an on-vehicle lighting apparatus for providing light to assist in photographing of surroundings of a vehicle includes: a lighting unit that is capable of selectively lighting multiple divided areas into which a specific area of the surroundings of the vehicle is divided; a first input unit that receives signals representing a lighting status of a driving lighting system used during driving of the vehicle and being able to light a part of the multiple divided areas; and a controller that selects one or more of the divided areas to be lit out of the multiple divided areas based on the lighting status of the driving lighting system and that commands the lighting unit to light the selected one or more divided areas.

The selective lighting of the specific area can reduce consumed power because the entire specific area does not have to be lit constantly. Moreover, since one or more divided areas to be lit are selected according to the lighting status of the driving lighting system, only the selected one or more divided areas that need lighting are lit, which can effectively reduce consumed power.

According to another aspect of the invention, an on-vehicle lighting apparatus for providing light to assist in photographing surroundings of a vehicle includes: a lighting unit that is capable of selectively lighting multiple divided areas into which a specific area of the surroundings of the vehicle is divided; an image generating unit that generates a composite image viewed from a virtual viewpoint based on multiple images obtained by photographing the surroundings of the vehicle with multiple cameras; and a controller that selects, out of the multiple divided areas, one or more divided areas to be included in the composite image and that commands the lighting unit to light the selected one or more divided areas.

The lighting of the divided areas according to the areas included in the composite image can effectively reduce consumed power because only areas necessary for the composite image are lit.

According to another aspect of the invention, an on-vehicle lighting apparatus for providing light to assist in photographing surroundings of a vehicle includes: a lighting unit that is capable of selectively lighting multiple divided areas into which a specific area of the surroundings of the vehicle is divided; an input unit that receives a detection result of a sensor that detects an object in the surroundings of the vehicle; and a controller that selects, out of the multiple divided areas, one or more divided areas corresponding to an identified position of the object and that commands the lighting unit to light the selected one or more divided areas.

The lighting of the one or more divided areas corresponding to the identified position of the object can effectively reduce consumed power and also direct a driver's attention to the detected object.

Therefore, it is an object of the invention to provide a technology that reduces consumed power related to lighting for assisting in photographing surroundings of a vehicle.

These and other objects, features, aspects and advantages of the present invention will become more apparent from the following detailed description of the present invention when taken in conjunction with the accompanying drawings.

DESCRIPTION OF THE EMBODIMENTS

Hereinbelow, embodiments of the invention are described with reference to the drawings.

1. First Embodiment

<1-1. Composition>

Figure 1:
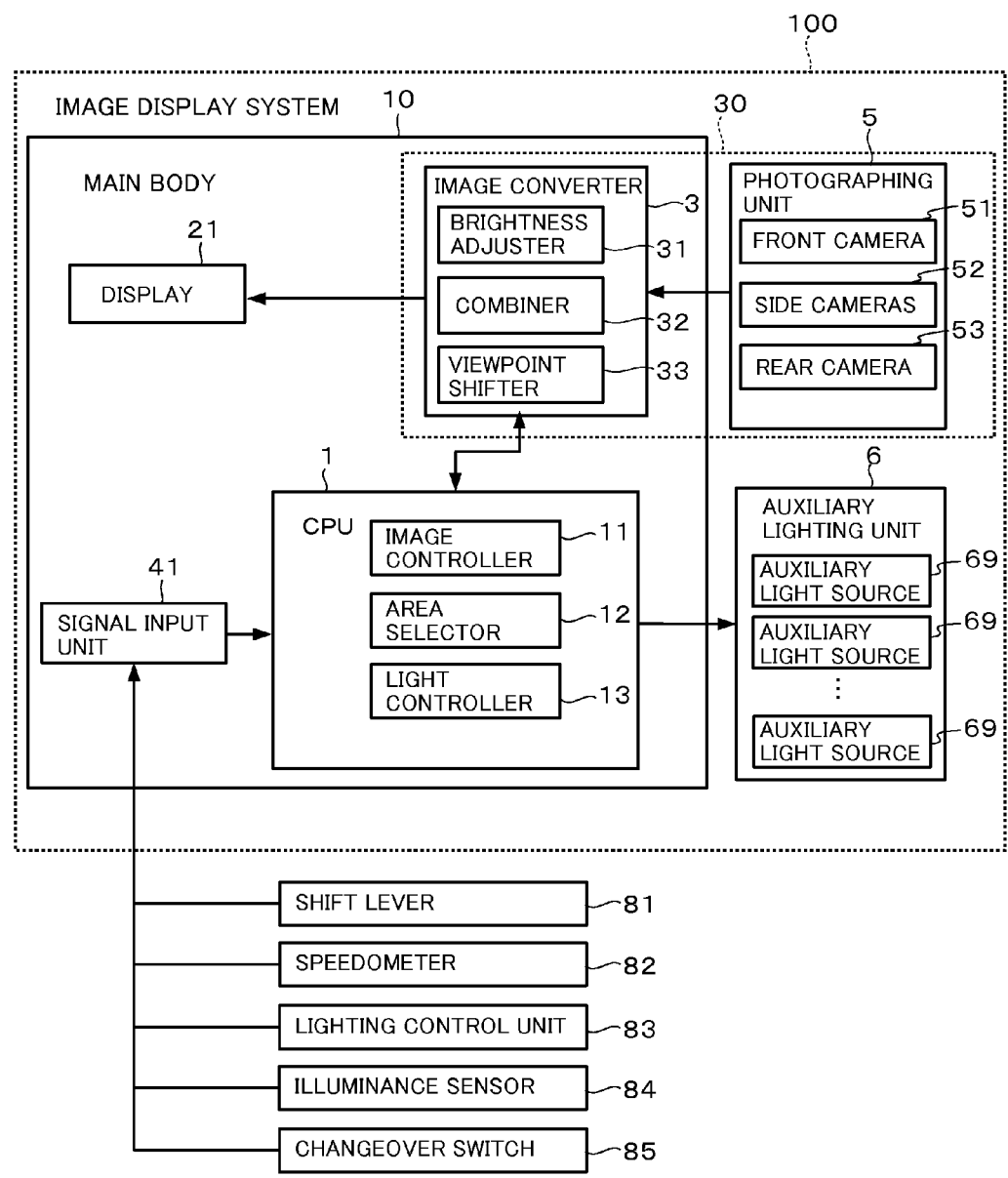
FIG. 1 is a block diagram of an image display system of a first embodiment.

FIG. 1 is a block diagram of an image display system 100 of a first embodiment. The image display system 100 is installed on a vehicle (a car in this embodiment) and has functions of photographing surroundings of the vehicle to generate and display an image in a cabin of the vehicle. The image display system 100 allows a driver to easily see the surroundings of the vehicle.

As shown in FIG. 1, the image display system 100 includes a main body 10 and a photographing unit 5 for photographing surroundings of the vehicle. Moreover, the image display system 100 functions as an on-vehicle lighting apparatus for providing light to assist the photographing unit 5 in photographing and is equipped with an auxiliary lighting unit 6 for providing the light for assistance. The main body 10 includes a display 21 such as a liquid crystal display, and the display 21 is placed on an instrument panel or other places of the vehicle where the driver can see a screen of the display 21. The photographing unit 5 and the auxiliary lighting unit 6 are electrically connected to the main body 10 and operate according to signals from the main body 10.

The photographing unit 5 includes a front camera 51, side cameras 52 and a rear camera 53, all of which are installed on the vehicle. Each of these on-vehicle cameras 51, 52 and 53 includes a lens and an image sensor and captures electronic images.

Figure 2:
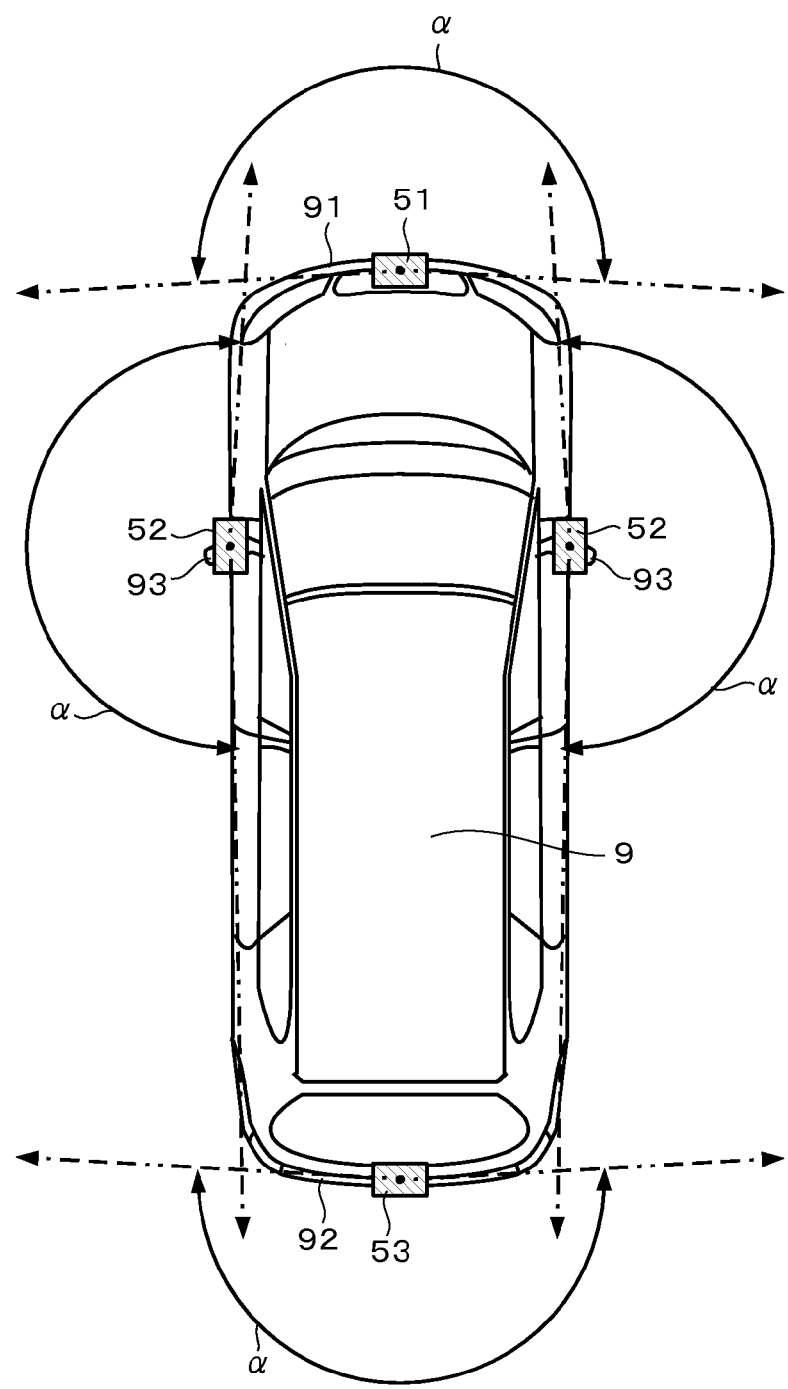
FIG. 2 shows positions of multiple on-vehicle cameras disposed on a vehicle.

FIG. 2 shows positions of the on-vehicle cameras 51, 52 and 53 disposed on a vehicle 9. As shown in FIG. 2, the front camera 51 is disposed at an approximate center of a width of a front bumper 91 that is a front end of the vehicle 9, with its optical axis directed in a direction in which the vehicle 9 travels. Moreover, the side cameras 52 are respectively disposed on right and left door mirrors 93, with their optical axes directed outward from the vehicle 9 in a direction orthogonal to the direction in which the vehicle 9 travels. The rear camera 53 is disposed at an approximate center of a width of a rear bumper 92 that is a rear end of the vehicle 9, with its optical axis directed in a direction opposite to the one in which the vehicle 9 travels.

A fish-eye lens is one type of lenses used for the on-vehicle cameras 51, 52 and 53 that have an angle of a view α of 180 degrees or more. As a result, by using these four on-vehicle cameras 51, 52 and 53, an entire circumference of the vehicle 9 can be photographed.

Referring back to FIG. 1, the auxiliary lighting unit 6 includes multiple auxiliary light sources 69. The multiple auxiliary light sources 69 are composed of LEDs that emit invisible near-infrared light or the like. Since near-infrared light is invisible to human beings, even when the auxiliary light source 69 lights the surroundings of the vehicle 9, it has no effect on walkers and other people around the vehicle 9. On the other hand, the image sensors adopted for the on-vehicle cameras 51, 52 and 53 include CCDs, CMOSs, etc. that sense near-infrared light. As a result, in a case where the vehicle 9 is in a relatively dark surrounding environment, the auxiliary light source 69 lights an area surrounding the vehicle 9 with near-infrared auxiliary light thereof. Therefore, images bright enough to show a situation of the lit area can be captured with no effect on walkers and other people.

Figure 3:
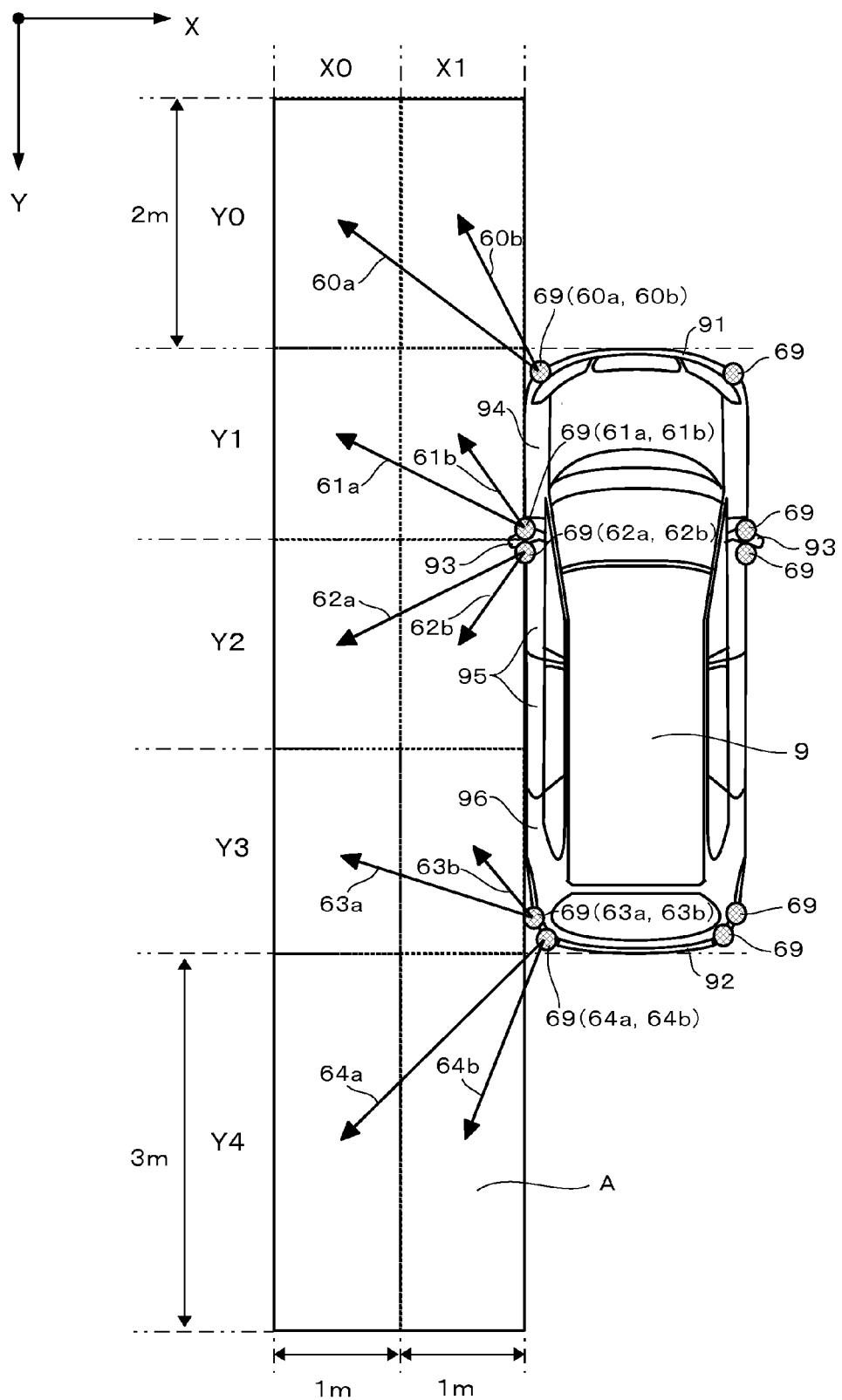
FIG. 3 shows positions of multiple auxiliary light sources disposed on a vehicle.

FIG. 3 shows positions of the multiple auxiliary light sources 69 disposed on the vehicle 9. As shown in FIG. 3, the auxiliary light sources 69 are respectively disposed at right and left ends of the front bumper 91, the right and left door mirrors 93, and right and left ends of the rear bumper 92. Hereinafter, while the left side of the vehicle 9 is concretely explained by way of example, the same can be applied to the right side of the vehicle 9, because lighting units are symmetrically disposed in the vehicle 9.

The multiple auxiliary light sources 69 disposed on a lateral side of the vehicle 9 light an intended lighting area A that is a lateral area defined outside the lateral side of the vehicle 9. A specific area based on a position of the vehicle 9 is defined as the intended lighting area A. Concretely, the defined intended lighting area A is an area having a length from approximately two meters ahead of the front bumper 91 that is the front end of the vehicle 9 to approximately three meters behind the rear bumper 92 that is a rear end of the vehicle 9, and having a width of approximately two meters outward from the lateral side (a side composed of a front fender 94, a door 95, a rear fender 96, etc.) of the vehicle 9. Each of the multiple auxiliary light sources 69 lights one of the divided areas into which the intended lighting area A is divided.

For convenience in explanation, a width direction of the vehicle 9 in a drawing is hereinafter referred to as an X-axis direction and a longitudinal direction of the vehicle 9 in a drawing is hereinafter referred to as a Y-axis direction. The intended lighting area A is divided into two sections in the X-axis direction and five sections in the Y-axis direction, and each of those sections is referred to as a divided area. The divided areas can be identified by codes shown in the drawings, of X-axis coordinate (X0 and X1) and of Y-axis coordinate (from Y0 to Y4). Moreover, the optical axes of the auxiliary light sources 69 are given the same reference numerals as the corresponding auxiliary light sources 69 in the drawings to clarify lighting directions of the auxiliary light sources 69.

Two auxiliary light sources 60a and 60b are respectively disposed at right and left ends of the front bumper 91. The two auxiliary light sources 60a and 60b, with their optical axes directed forward, light a divided area Y0 (hereinafter referred to as a frontward area) ahead of the front bumper 91. The auxiliary light source 60a lights an outer first frontward area X0Y0 and the auxiliary light source 60b lights an inner second frontward area X1Y0.

Four auxiliary light sources 61a, 61b, 62a and 62b are disposed on the door mirror 93. The two auxiliary light sources 61a and 61b of the four, with their optical axes directed forward, light a divided area Y1 (hereinafter referred to as a front area) near the front fender 94 outside the vehicle 9. The auxiliary light source 61a lights an outer first front area X0Y1 and the auxiliary light source 61b lights an inner second front area X1Y1.

On the other hand, the two auxiliary light sources 62a and 62b, with their optical axes directed backward, light a divided area Y2 (hereinafter referred to as a door area) near the door 95 outside the vehicle 9. The auxiliary light source 62a lights an outer first door area X0Y2 and the auxiliary light source 62b lights an inner second door area X1Y2.

Four auxiliary light sources 63a, 63b, 64a and 64b are disposed on the rear bumper 92. The two auxiliary light sources 63a and 63b of the four, with their optical axes directed forward, light a divided area Y3 (hereinafter referred to as a rear area) near the rear fender 96 outside the vehicle 9. The auxiliary light source 63a lights an outer first rear area X0Y3 and the auxiliary light source 63b lights an inner second rear area X1Y3.

On the other hand, the two auxiliary light sources 64a and 64b, with their optical axes directed backward, light an divided area Y4 (hereinafter referred to as a backward area) behind the rear bumper 92. The auxiliary light source 64a lights an outer first backward area X0Y4 and the auxiliary light source 64b lights an inner second backward area X1Y4.

As described above, the multiple auxiliary light sources 69 of the auxiliary lighting unit 6 individually light a divided area that each of the multiple auxiliary light sources 69 is required to light. Each of the multiple auxiliary light sources 69 can be independently turned on, which allows a divided area to be arbitrarily and selectively lit.

Referring back to FIG. 1, the main body 10 includes, in addition to the display 21, an image converter 3 for processing and converting photographed images captured by the photographing unit 5 to an image for display, and a CPU1 for performing various kinds of arithmetic processing. The image generated by the image converter 3 is output and displayed on the display 21. A combination of the photographing unit 5 and the image converter 3 can be an image generating unit for photographing the surroundings of the vehicle 9, and generating and outputting an image including the specific area (the intended lighting area A in this embodiment) of the surroundings of the vehicle 9 onto a display unit.

The image converter 3 can generate a composite image viewed from a virtual viewpoint from multiple photographed images captured by the multiple on-vehicle cameras 51, 52, and 53 of the photographing unit 5. The image converter 3 is a hardware circuit including a brightness adjuster 31, a combiner 32, and a viewpoint shifter 33, all of which are necessary for such image processing.

The brightness adjuster 31 adjusts gain of a photographed image, referring to an average brightness representing overall brightness of the photographed image captured by the photographing unit 5. Concretely, in a case where an average brightness of a photographed image is relatively high, the brightness adjuster 31 slightly adjusts gain. In a case where an average brightness of the photographed image is relatively low, the brightness adjuster 31 adjusts gain much. In a case where the vehicle 9 is located in a relatively dark surrounding environment or in other cases, brightness of the photographed image may need to be adjusted. However, in a case where the vehicle 9 is located in a very dark surrounding environment, such as at night, the photographed image cannot be brightened enough to serve as a displayed image even by gain adjustment. Therefore, lighting by the auxiliary lighting unit 6 is required.

The combiner 32 combines gain-adjusted multiple photographed images captured by the multiple on-vehicle cameras 51, 52, and 53 into a combined image. The viewpoint shifter 33 uses a combined image generated by the combiner 32 to further generate a composite image viewed from an arbitrary virtual viewpoint in surroundings of the vehicle 9. The method for generating a composite image viewed from a virtual viewpoint is described later.

The CPU 1 functions as a controller for integratedly controlling each part of the image display system 100. Each controlling function of the CPU 1 is performed by software as a result of performance of arithmetic processing in accordance with a program pre-memorized in a predetermined memory or the like. An image controller 11, an area selector 12, and a light controller 13, shown in FIG. 1, represent a part of the functions performed as described above by the CPU 1.

The image controller 11 outputs control signals to the image converter 3 to control the image processing performed by the image converter 3. A position of a virtual viewpoint of a composite image generated by the image converter 3 is among items specified by the image controller 11. The area selector 12 selects the divided areas to be lit in a case where the intended lighting area A is lit by the auxiliary lighting unit 6. The light controller 13 outputs control signals to the auxiliary lighting unit 6 to command the auxiliary lighting unit 6 to light the divided areas selected by the area selector 12.

The main body 10 includes a signal input unit 41 for receiving signals from various devices installed in or on the vehicle 9. Signals from the devices other than the image display system 100 are input into the CPU 1 via the signal input unit 41. Concretely, signals representing various types of information are input to the CPU 1 from a shift lever 81, a speedometer 82, a lighting control unit 83, an illuminance sensor 84, a changeover switch 85, etc. Information about a shift position represented by "P," "D," "N," "R" or others is input from the shift lever 81. Information about a driving speed (km/h) of the vehicle 9 at a time is input from the speedometer 82.

The lighting control unit 83 controls a driving lighting system that is provided differently from the auxiliary lighting unit 6 and is used during regular driving of the vehicle 9. The driving lighting system includes headlights, parking lights, tail lights, brake lights, backup lights, etc. The lighting control unit 83 turns the headlights, the parking lights or other lights on in response to an operation by a driver, and when it turns the headlights or the parking lights on, it also turns the tail lights on. The lighting control unit 83 turns the brake lights on when the driver presses a brake pedal and it turns the backup lights on when the shift lever is in a position of "R." Various kinds of lighting status information of the driving lighting system are input from the lighting control unit 83 to the CPU 1.

The driving lighting system can light a part of the multiple divided areas of the intended lighting area A. FIGS. 4 to 7 show divided areas of the intended lighting area A, that the driving lighting system can light. Shaded divided areas in these drawings show divided areas that the driving lighting system can light at a level (e.g. 0.5 lux or more) where images of those areas can be captured with enough brightness without the auxiliary lighting unit 6 even in a case of a dark surrounding environment of the vehicle 9.

Figure 4:
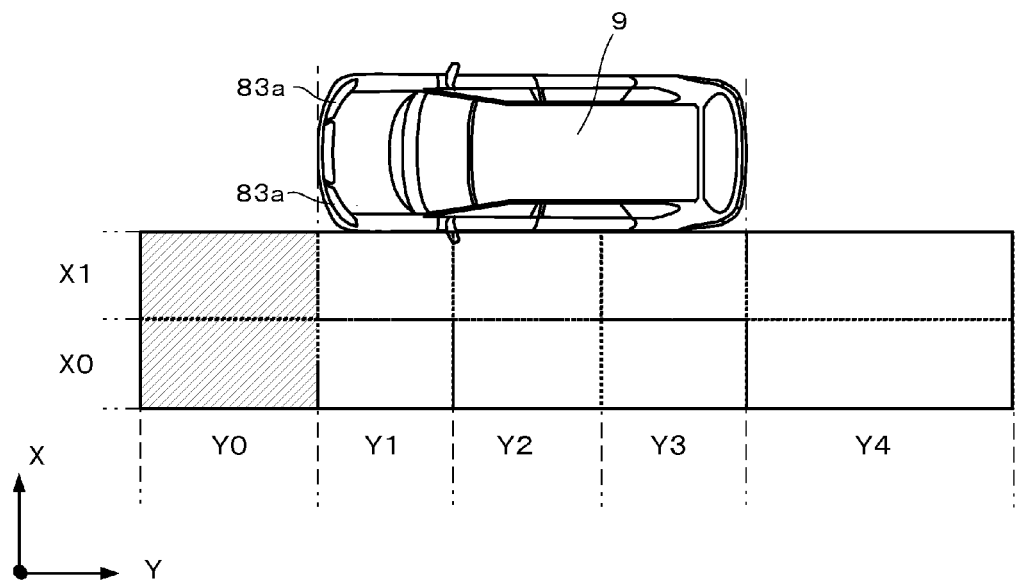
FIG. 4 shows divided areas that headlights can light.
Figure 5:
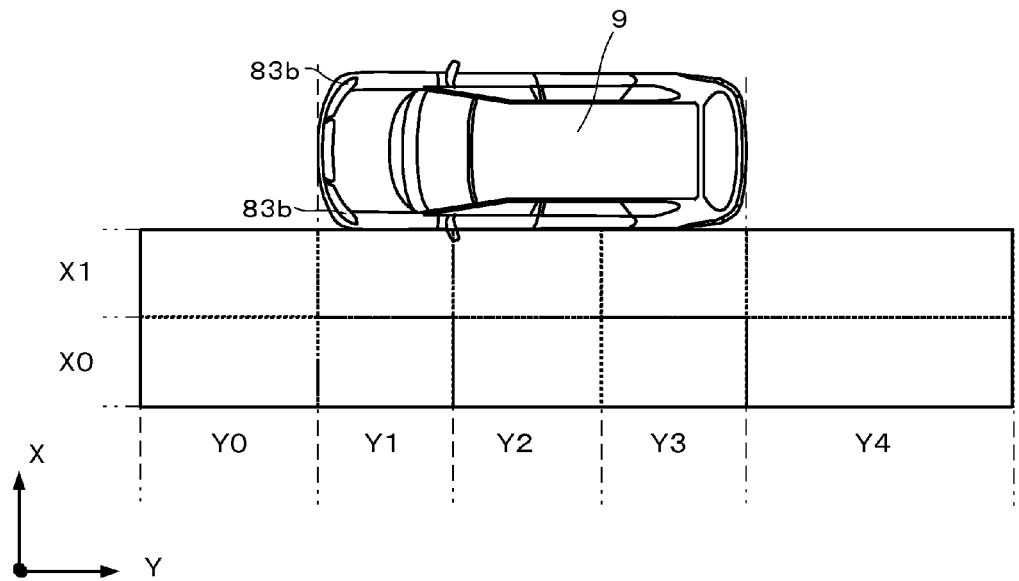
FIG. 5 shows divided areas that parking lights can light.
Figure 6:
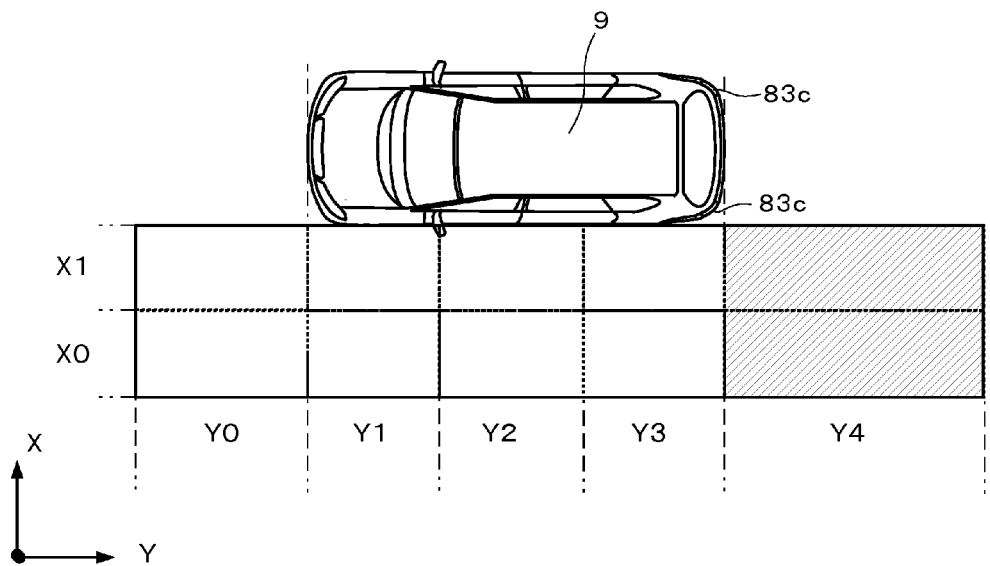
FIG. 6 shows divided areas that brake lights can light.
Figure 7:
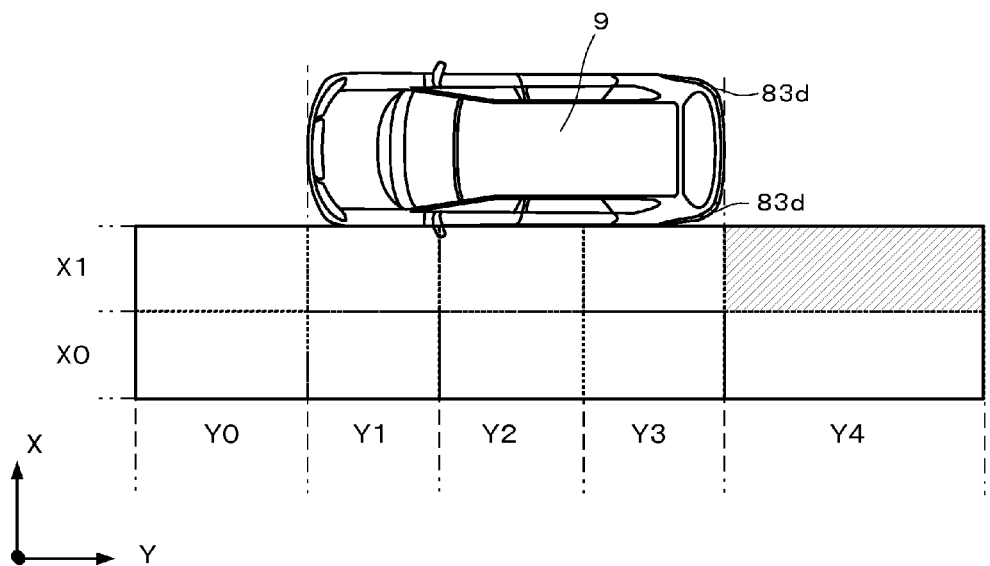
FIG. 7 shows a divided area that a driving lighting system can light.

FIG. 4 shows divided areas that headlights 83a can light. The headlights 83a light the frontward area Y0 (the first frontward area X0Y0 and the second frontward area X1Y0) at a level able to capture an image. FIG. 5 shows divided areas that parking lights 83b can light. The parking lights 83b cannot light any divided area at a level able to capture an image. FIG. 6 shows divided areas that brake lights 83c can light. The brake lights 83c light the backward area Y4 (the first backward area X0Y4 and the second backward area X1Y4) at a level able to capture an image. Moreover, divided areas that the backup lights can light are the same as the ones shown in FIG. 6, which the brake lights 83c can light. FIG. 7 shows divided areas that tail lights 83d can light. The tail lights 83d light only the second backward area X1Y4 at a level able to capture an image.

Referring back to FIG. 1, the illuminance sensor 84 is installed on an upper center of a windshield or on a dashboard and senses illuminance that indicates brightness of the surrounding environment of the vehicle 9. The sensed illuminance is input to the CPU 1 from the illuminance sensor 84. The changeover switch 85 is for receiving a command from a driver to change contents to be displayed on the display 21. The command from the driver is input to the CPU 1 from the changeover switch 85.

<1-2 Image Converting Process>

Figure 8:
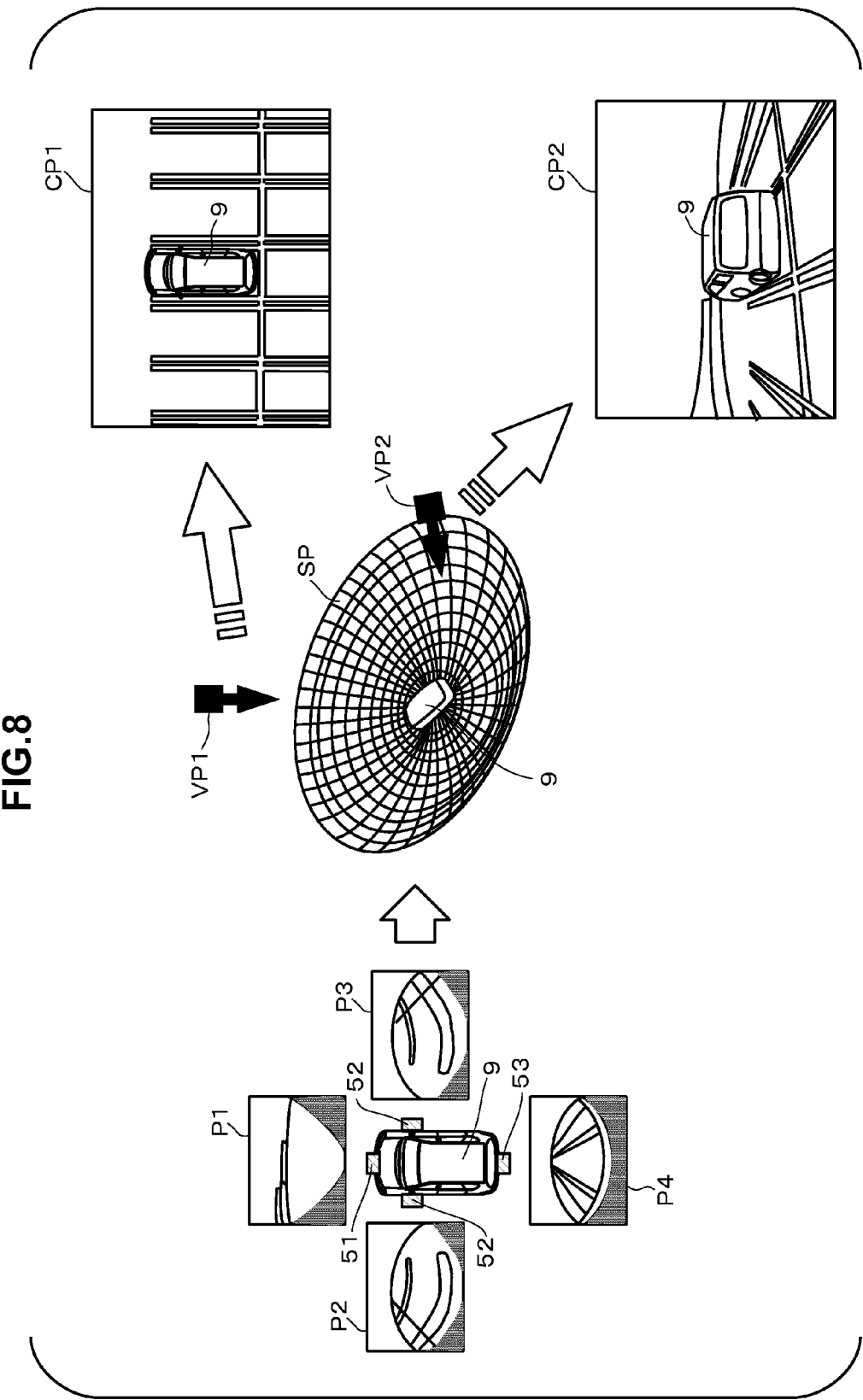
FIG. 8 is a drawing to explain a method for generating a composite image viewed from an arbitrary virtual viewpoint.

Next described is a method where the viewpoint shifter 33 of the image converter 3 generates a composite image viewed from an arbitrary virtual viewpoint based on multiple photographed images captured by the photographing unit 5. FIG. 8 is a drawing to explain a method for generating a composite image viewed from an arbitrary virtual viewpoint.

When the front camera 51, the side cameras 52, and the rear camera 53 of the photographing unit 5 simultaneously take photographs, the photographing unit 5 captures four photographed images P1, P2, P3 and P4 respectively showing images ahead of, on the right and left sides of, and behind the vehicle 9. In other words, the four photographed images P1, P2, P3 and P4 captured by the photographing unit 5 include information of an entire circumference of the vehicle 9 at a time of photographing.

The four captured photographed images P1, P2, P3 and P4 are combined and then projected on a virtual three-dimensional curved surface SP by the viewpoint shifter 33. An exemplary shape of the three-dimensional curved surface SP is approximately hemispherical (a shape of a bowl), and a center of the approximate hemisphere (a bottom of the bowl) is defined as a position of the vehicle 9. A correspondence between positions of individual pixels included in the photographed images P1, P2, P3 and P4 and positions of individual pixels included the curved surface SP is predetermined. Therefore, values of the individual pixels of the curved surface SP can be determined based on the correspondence relation and the values of the individual pixels included in the photographed images P1, P2, P3 and P4. The correspondence between positions of the individual pixels included in the photographed images P1, P2, P3 and P4 and positions of the individual pixels included in the curved surface SP is memorized in a data table in a predetermined memory in the main body 10.

On the other hand, positions of virtual viewpoints VP1 and VP2 toward the curved surface SP are determined. Depending on the determined virtual viewpoints VP1 and VP2, a necessary area on the curved surface SP is retrieved as an image and then a composite image viewed from the arbitrary virtual viewpoint is generated. For example, when the virtual viewpoint VP1 is positioned right above the vehicle 9, a composite image CP1 in which the vehicle 9 is viewed from directly above is generated. Moreover, as shown in the FIG. 8, when the virtual viewpoint VP2 is positioned behind the vehicle 9, a composite image CP2 in which entire surroundings of the vehicle 9 are viewed from behind the vehicle 9 is generated. A relation between the virtual viewpoint and the necessary area on the curved surface SP is predetermined and memorized in a data table in a predetermined memory in the main body 10.

Values of all the pixels of the curved surface SP do not need to be determined to actually generate a composite image. A combining process can be faster by determining values of pixel of only the necessary area corresponding to the virtual viewpoint based on the photographed images P1, P2, P3 and P4. A picture of the vehicle 9 to be shown in a composite image is obtained by memorizing pictures of the vehicle 9 oriented in various directions in a predetermined memory in advance in bitmap or other formats, and superimposing one of the memorized pictures of the vehicle 9 which is oriented in a direction corresponding to the virtual view point, on a generated composite image.

<1-3 Lighting Pattern>

Through the image converting process mentioned above, a composite image from an arbitrary viewpoint of the surroundings of the vehicle 9 is generated and displayed on the display 21. A position of the virtual viewpoint is determined according to various conditions, and the composite image including the intended lighting area A may be displayed on the display 21. In a case where the surrounding environment of the vehicle 9 is relatively dark in generating the composite image including the intended lighting area A, the auxiliary lighting unit 6 lights the intended lighting area A.

However, constant lighting of the entire intended lighting area A may waste electricity. For example, there is little need for an area lit by the driving lighting system to be lit by the auxiliary lighting unit 6. In addition, depending on a driving status of the vehicle 9, of the intended lighting area A there is an area to which a driver needs to pay little attention. Therefore, in the image display system 100, the area selector 12 selects divided areas to be lit according to a lighting status of the driving lighting system and a driving status of the vehicle 9. Thus only necessary divided areas are lit. The driving status used for selecting the divided areas to be lit includes a shift position of the shift lever 81 and a driving speed from the speedometer 82.

In this embodiment, there are eleven patterns for selectively lighting the divided areas of the intended lighting area A (hereinafter referred to as a lighting pattern).

FIGS. 9 to 19 explain the respective eleven lighting patterns. The shaded areas in those drawings represent divided areas lit by the auxiliary lighting unit 6 in the respective lighting patterns, and only optical axes of the auxiliary light sources 69 to be turned on are shown. Hereinbelow, the respective eleven lighting patters are explained with reference to these drawings.

<1-3-1. First Lighting Pattern>

Figure 9:
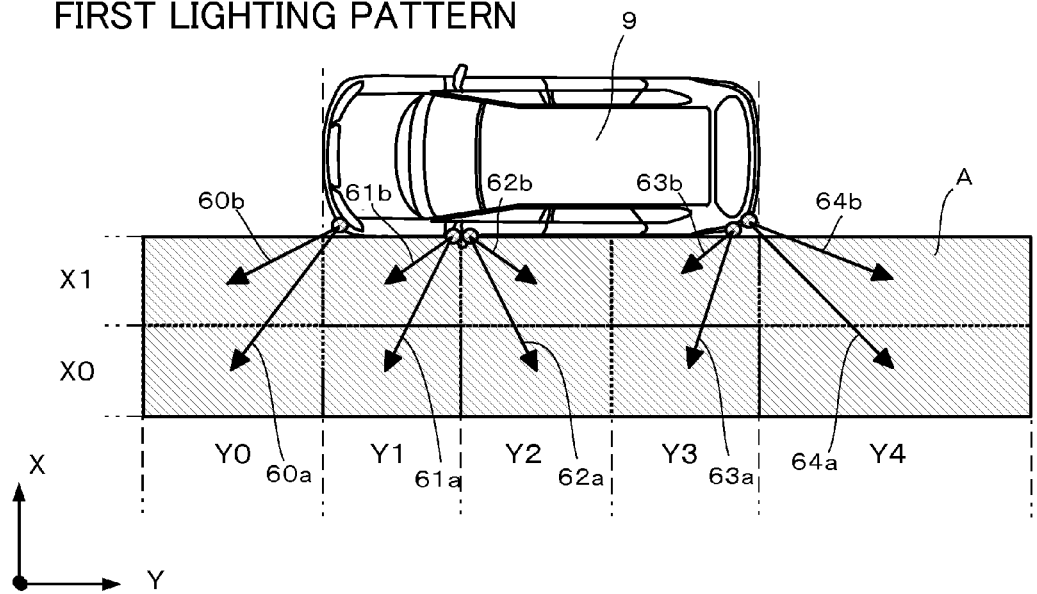
FIG. 9 shows a first lighting pattern.

FIG. 9 shows a first lighting pattern. In the first lighting pattern, the entire intended lighting area A is lit. In other words, all the divided areas are selected to be lit.

The first lighting pattern is selected when a set of conditions listed below is met.

(1) The shift lever 81 is positioned at "P" or "N" with all lights of the driving lighting system off.

In this case, the vehicle 9 stops. Therefore, the widest possible area is lit so that a driver can look over the surroundings of the vehicle 9 at a wide range.

<1-3-2. Second Lighting Pattern>

Figure 10:
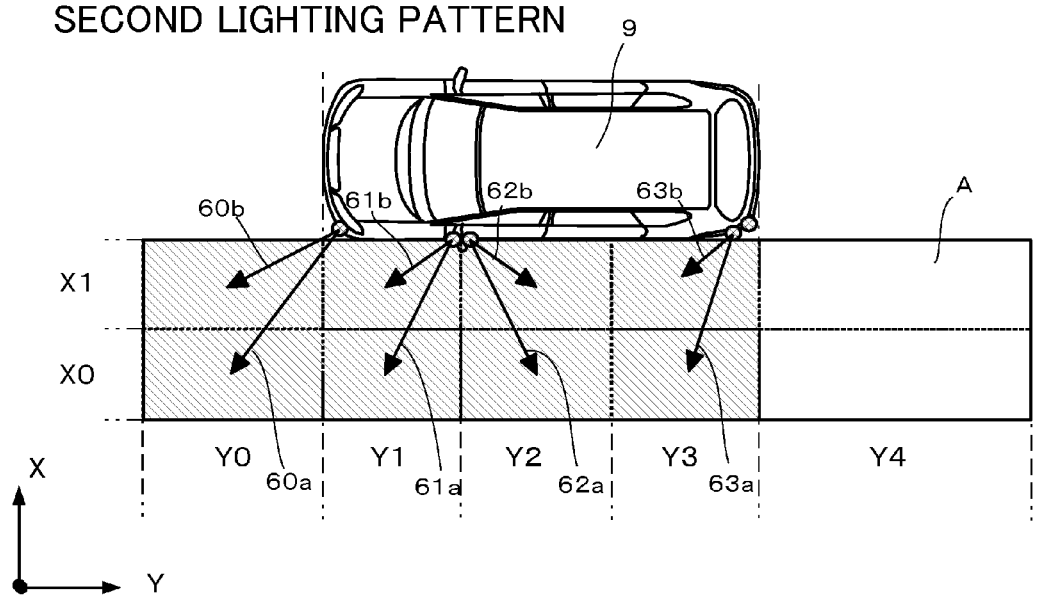
FIG. 10 shows a second lighting pattern.

FIG. 10 shows a second lighting pattern. In the second lighting pattern, an area forward of the rear end of the vehicle 9 is lit. Specifically, the divided areas in the frontward area Y0, the front area Y1, the door area Y2, and the rear area Y3 are selected to be lit.

The second lighting pattern is selected when either set of conditions listed below is met.

(1) The shift lever 81 is positioned at "P" or "N" with the brake lights on and the headlights off.

(2) The shift lever 81 is positioned at "D" or "R" at a driving speed of 0 km/h with the brake lights on and the headlights off.

In this case, also, the vehicle 9 stops. Therefore, the widest possible area is lit so that the driver can look over the surroundings of the vehicle 9 at a wide range. However, the backward area Y4 is not lit by the auxiliary lighting unit 6 because the brake lights 83c which can light the backward area Y4 is turned on (refer to FIG. 6).

<1-3-3. Third Lighting Pattern>

Figure 11:
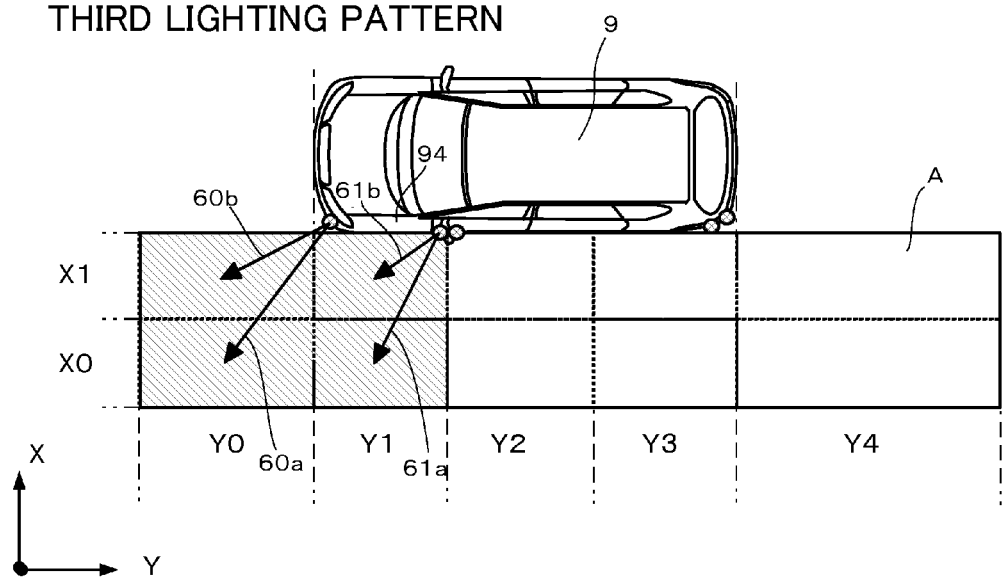
FIG. 11 shows a third lighting pattern.

FIG. 11 shows a third lighting pattern. In the third lighting pattern, an area outside the front fender 94 and forward of the front fender 94 is lit. Specifically, the divided areas in the frontward area Y0 and the front area Y1 are selected to be lit.

The third lighting pattern is selected when a set of conditions listed below is met.

(1) The shift lever 81 is positioned at "D" at a driving speed of 5 km/h or faster with the headlights off.

In this case, the vehicle 9 runs at a relatively high speed. Therefore, only a relatively forward area is lit to call a driver's attention to a traveling direction of the vehicle 9.

<1-3-4. Fourth Lighting Pattern>

Figure 12:
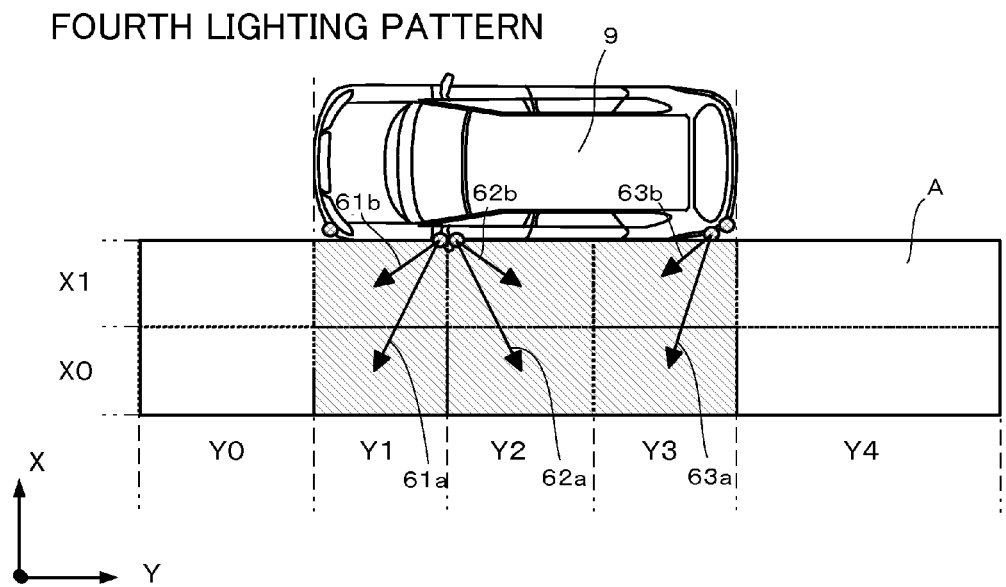
FIG. 12 shows a fourth lighting pattern.

FIG. 12 shows a fourth lighting pattern. In the fourth lighting pattern, an area from the front end to the rear end of the vehicle 9 is lit. Specifically, the divided areas in the front area Y1, the door area Y2, and the rear area Y3 are selected to be lit.

The fourth lighting pattern is selected when either set of conditions listed below is met.

(1) The shift lever 81 is positioned at "P" or "N" with the brake lights, headlights, and tail lights on.

(2) The shift lever 81 is positioned at "D" or "R" at a driving speed of 0 km/h with the brake lights, headlights, and tail lights on.

In this case, the vehicle 9 stops. Therefore, the widest possible area is lit so that the driver can look over the surroundings of the vehicle 9 at a wide range. However, the frontward area Y0 and the backward area Y4 do not need auxiliary lighting because the headlights 83a lights the frontward area Y0 (refer to FIG. 4) and the brake lights 83c light the backward area Y4 (refer to FIG. 6).

<1-3-5. Fifth Lighting Pattern>

Figure 13:
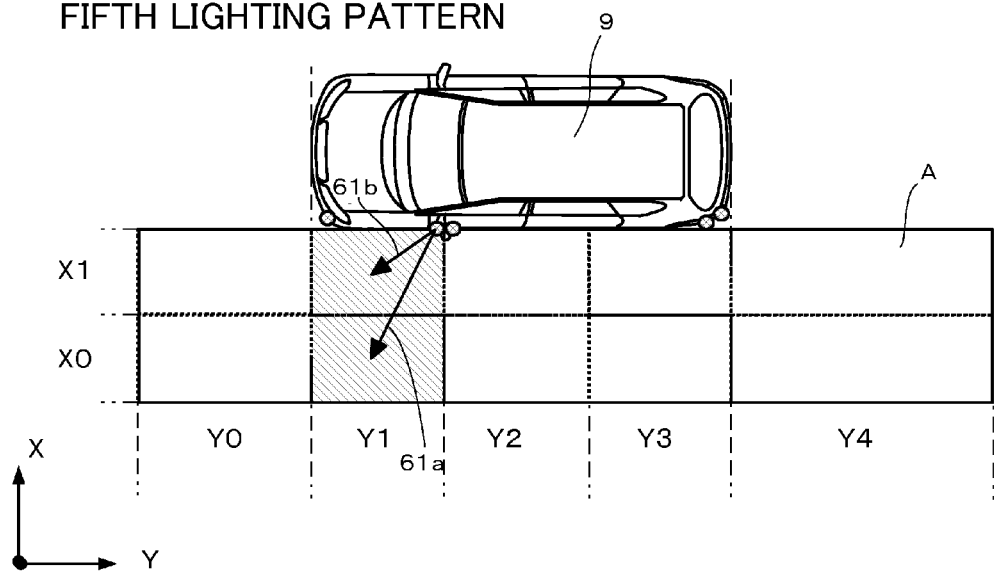
FIG. 13 shows a fifth lighting pattern.

FIG. 13 shows a fifth lighting pattern. In the fifth lighting pattern, an area outside the front fender 94 of the vehicle 9 is lit. Specifically, the divided areas in only the front area Y1 is selected to be lit.

The fifth lighting pattern is selected when a set of conditions listed below is met.

(1) The shift lever 81 is positioned at "D" at a driving speed of 5 km/h or faster with the headlights and the tail lights on.

In this case, the vehicle 9 runs at a relatively high speed. Therefore, only a relatively forward area is lit to call driver's attention to a traveling direction of the vehicle 9. However, the frontward area Y0 does not need auxiliary lighting because the headlights 83a lights the frontward area Y0 (refer to FIG. 4).

<1-3-6. Sixth Lighting Pattern>

Figure 14:
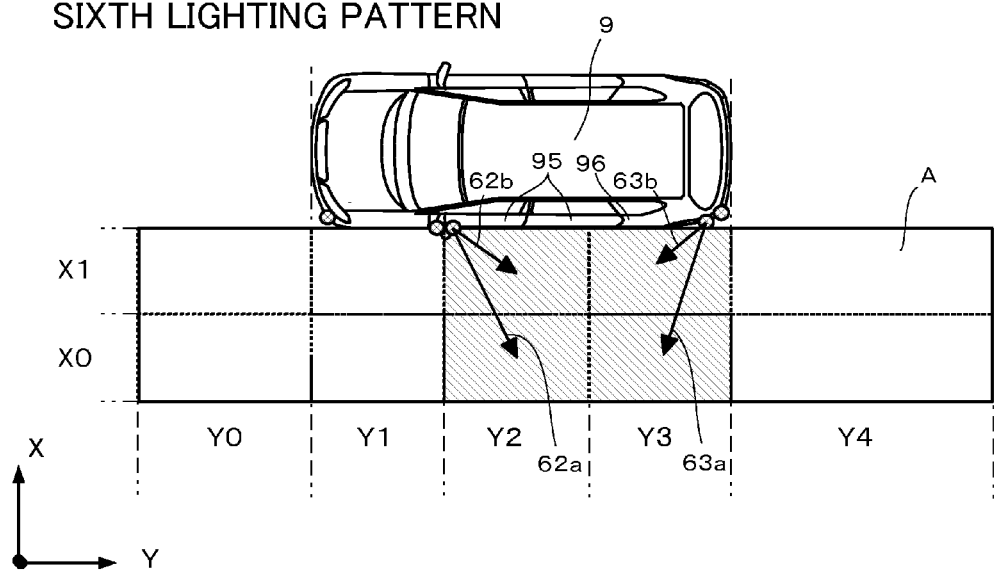
FIG. 14 shows a sixth lighting pattern.

FIG. 14 shows a sixth lighting pattern. In the sixth lighting pattern, an area outside the vehicle 9, ranging from the doors 95 to the rear fender 96 is lit. Specifically, the divided areas in the door area Y2 and the rear area Y3 are selected to be lit.

The sixth lighting pattern is selected when a set of conditions listed below is met.

(1) The shift lever 81 is positioned at "R" at a driving speed of 5 km/h or faster.

In this case, the vehicle 9 runs at a relatively high speed. Therefore, only a relatively backward area is lit to call driver's attention to a direction where the vehicle 9 backs up. However, the backward area Y4 does not need auxiliary lighting because the backup lights light the backward area Y4.

<1-3-7. Seventh Lighting Pattern>

Figure 15:
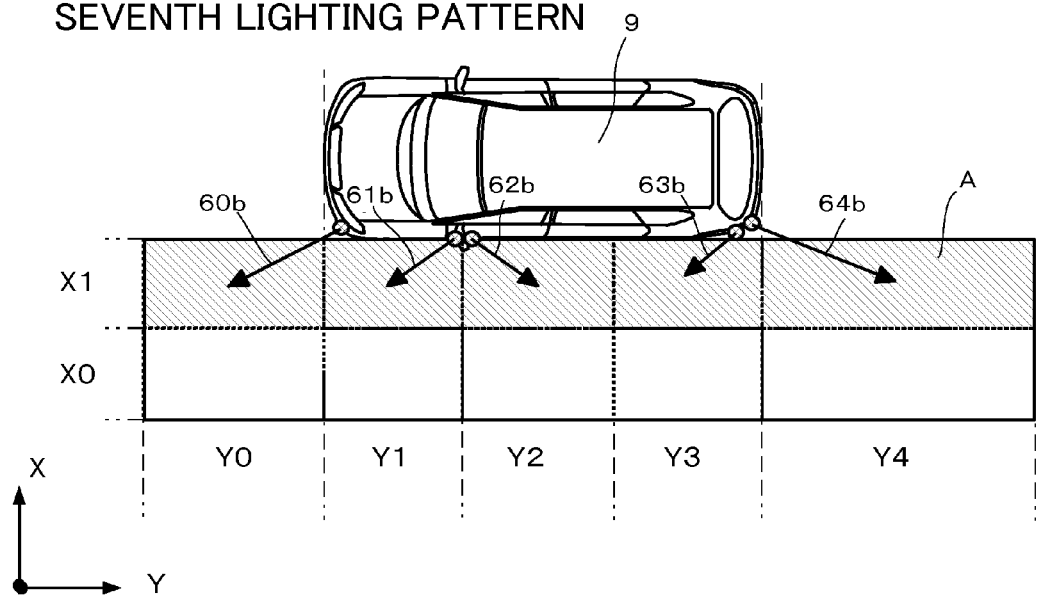
FIG. 15 shows a seventh lighting pattern.

FIG. 15 shows a seventh lighting pattern. In the seventh lighting pattern, an inner part X1 of the intended lighting area A is lit. Specifically, the divided areas of the second frontward area X1Y0, the second front area X1Y1, the second door area X1Y2, the second rear area X1Y3, and the second backward area X1Y4 are selected to be lit.

The seventh lighting pattern is selected when a set of conditions listed below is met.

(1) The shift lever 81 is positioned at "D" at a driving speed of lower than 5 km/h with all lights of the driving lighting system off.

In this case, the vehicle 9 runs at a relatively slow speed to pass by an oncoming car on a narrow road, for example, and the driver pays attention to keep enough clearance between the vehicle 9 and an obstacle. Therefore, of the intended lighting area A only an area close to the vehicle 9 is lit to call driver's attention.

<1-3-8. Eighth Lighting Pattern>

Figure 16:
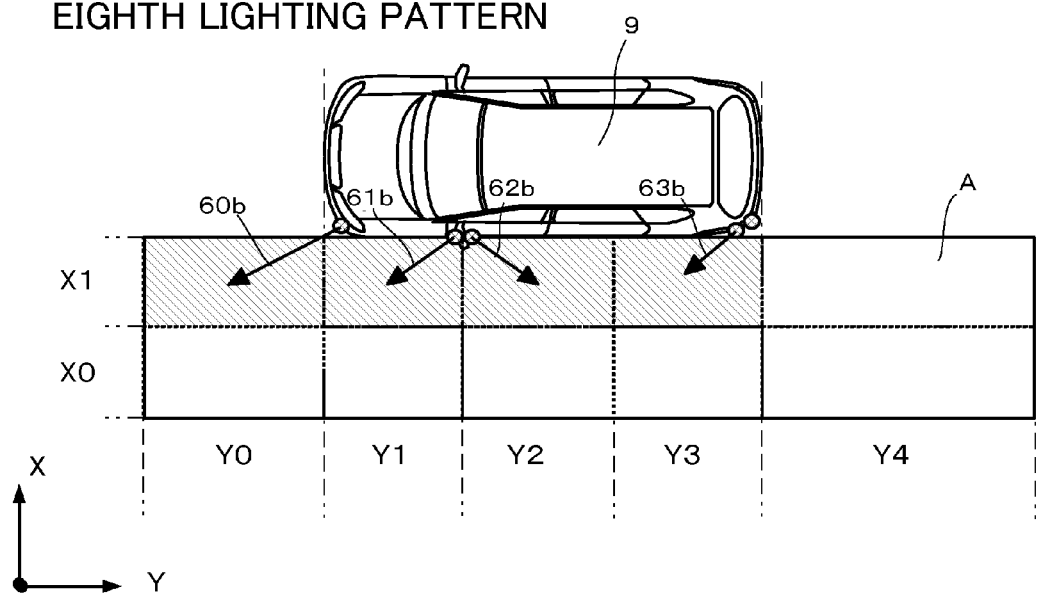
FIG. 16 shows an eighth lighting pattern.

FIG. 16 shows an eighth lighting pattern. In the eighth lighting pattern, of the intended lighting area A, an inner part in an area ahead of the rear end of the vehicle 9 is lit. Specifically, the divided areas of the second frontward area X1Y0, the second front area X1Y1, the second door area X1Y2, and the second rear area X1Y3 are selected to be lit.

The eighth lighting pattern is selected when one of sets of conditions listed below is met.

(1) The shift lever 81 is positioned at "D" at a driving speed of 0 km/h with the brake lights on.

(2) The shift lever 81 is positioned at "D" at a driving speed of lower than 5 km/h with the brake lights on or the parking and tail lights on.

(3) The shift lever 81 is positioned at "R" at a driving speed of lower than 5 km/h.

In this case, also, the vehicle 9 runs at a relatively slow speed. The driver pays attention to keep enough clearance between the vehicle 9 and an obstacle. Therefore, of the intended lighting area A only an area close to the vehicle 9 is lit to call driver's attention. However, the second backward area X1Y4 do not need auxiliary lighting because the brake lights 83c, the tail lights 83d, or the backup lights light the second backward area X1Y4 (refer to FIG. 6 and FIG. 7).

<1-3-9. Ninth Lighting Pattern>

Figure 17:
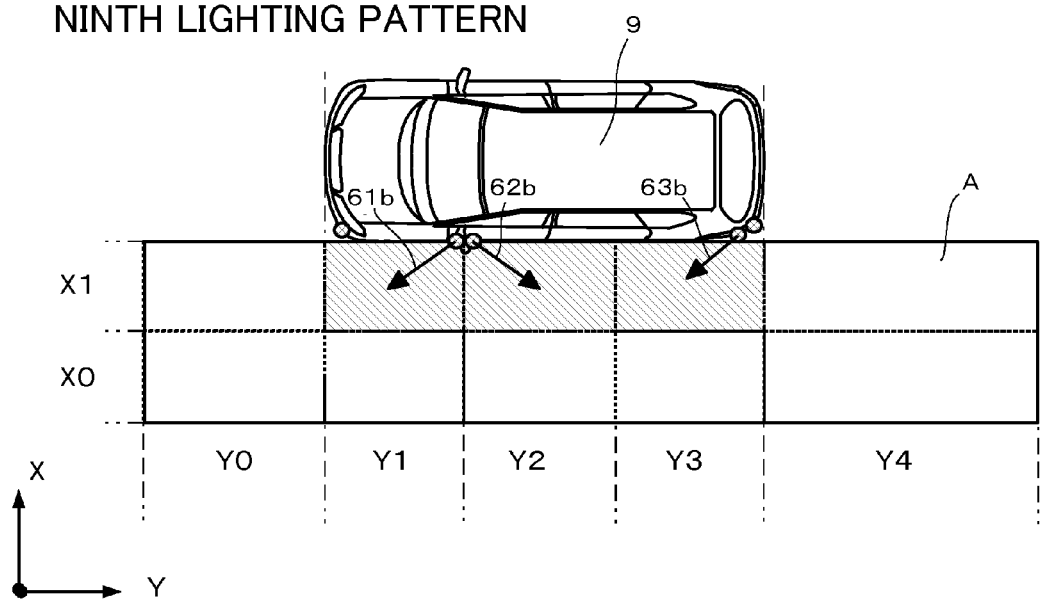
FIG. 17 shows a ninth lighting pattern.

FIG. 17 shows a ninth lighting pattern. In the ninth lighting pattern, an inner part in an area ranging from the front end to rear end of the vehicle 9 is lit. Specifically, the divided areas of the second front area X1Y1, the second door area X1Y2, and the second rear area X1Y3 are selected to be lit.

The ninth lighting pattern is selected when either set of conditions listed below is met.

(1) The shift lever 81 is positioned at "D" at a driving speed of lower than 5 km/h with the headlights and tail lights on.

(2) The shift lever 81 is positioned at "R" at a driving speed of lower than 5 km/h with the headlights and tail lights on.

In this case, also, the vehicle 9 runs at a relatively slow speed. The driver pays attention to keep enough clearance between the vehicle 9 and an obstacle. Therefore, only an area close to the vehicle 9 is lit to call driver's attention. However, the second frontward area X1Y0 and the second backward area X1Y4 do not need auxiliary lighting because the headlights 83a lights the second frontward area X1Y0 (refer to FIG. 4) and tail lights 83d light the second backward area X1Y4 (refer to FIG. 7).

<1-3-10. Tenth Lighting Pattern>

Figure 18:
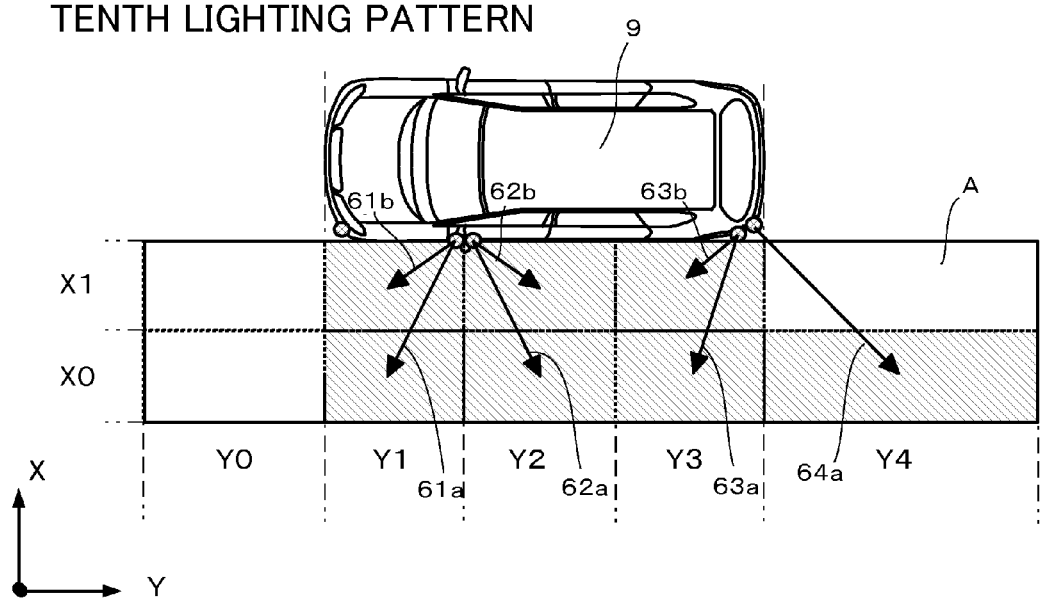
FIG. 18 shows a tenth lighting pattern.

FIG. 18 shows a tenth lighting pattern. In the tenth lighting pattern, an area from the front end to the rear end of the vehicle 9 and an outer part in an area behind the rear end of the vehicle 9 are lit. Specifically, the divided areas in the front area Y1, the door area Y2, and the rear area Y3, and a divided area of the first backward area X0Y4 are selected to be lit.

The tenth lighting pattern is selected when a set of conditions listed below is met.

(1) The shift lever 81 is positioned at "P" or "N" with the brake lights off and the headlights and tail lights on.

In this case, also, the vehicle 9 stops. Therefore, the widest possible area is lit so that the driver can look over the surroundings of the vehicle 9 at a wide range. However, the frontward area Y0 and the second backward area X1Y4 do not need auxiliary lighting because the headlights 83a lights the frontward area Y0 (refer to FIG. 4) and tail lights 83d lights the second backward area X1Y4 (refer to FIG. 6).

<1-3-11. Eleventh Lighting Pattern>

Figure 19:
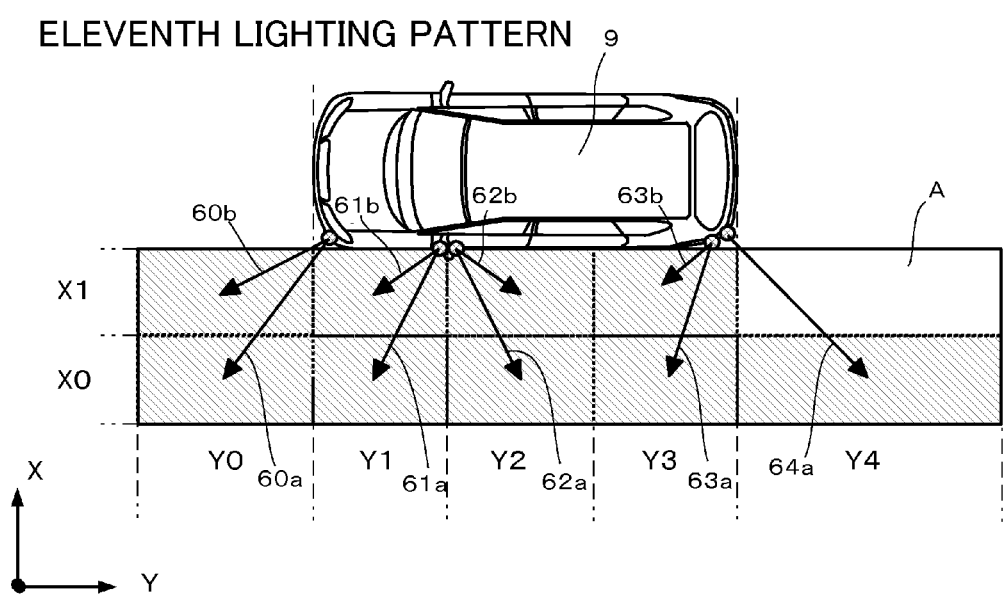
FIG. 19 shows an eleventh lighting pattern.

FIG. 19 shows an eleventh lighting pattern. In the eleventh lighting pattern, an area ahead of the rear end of the vehicle 9 and an outer part in an area behind the rear end of the vehicle 9 are lit. Specifically, the divided areas in the frontward area Y0, the front area Y1, the door area Y2, the rear area Y3, and a divided area of the first backward area X0Y4 are selected to be lit.

The eleventh lighting pattern is selected when a set of conditions listed below is met.

(1) The shift lever 81 is positioned at "P" or "N" with the brake lights off and the parking lights and tail lights on.

In this case, also, the vehicle 9 stops. Therefore, the widest possible area is lit so as that the driver can look over a surrounding of the vehicle 9 at a wide range. However, the second backward area X1Y4 does not need auxiliary lighting because tail lights 83d lights the second backward area X1Y4 (refer to FIG. 6).

<1-4. Process flow>

Figure 20:
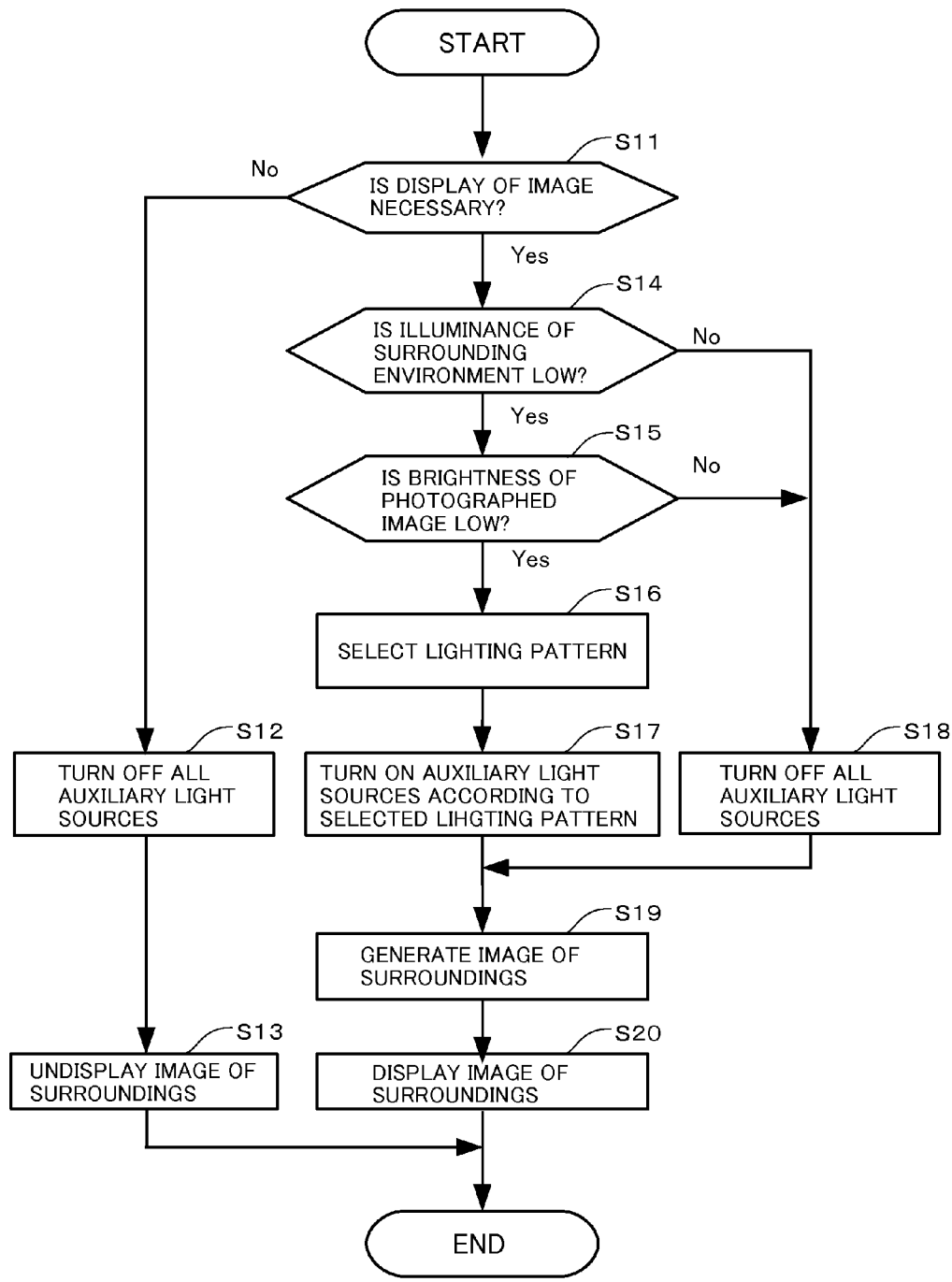
FIG. 20 shows a process flow of the image display system of the first embodiment.

Next described is a process flow for selecting one of the eleven lighting patterns mentioned above. FIG. 20 shows a process flow of the image display system 100. This process is repeatedly performed under control of the CPU 1 while the image display system 100 is running, and each process step is performed by functions of the CPU 1 unless otherwise mentioned.

First, the image display system 100 judges whether an image of surroundings of the vehicle 9 should be displayed on the display 21 (a step S11). In this embodiment, when the shift lever 81 is changed to "R," when a driver orders to display the image via the changeover switch 85, or on other occasions while the image display system 100 is running, the image display system 100 judges to show the image of surroundings. Based on signals input via the signal input unit 41 and other information, the image display system 100 judges whether or not the surrounding image needs to be displayed. In a case where the image of surroundings does not need be displayed ("No" at the step S11), all the multiple auxiliary light sources 69 are turned off (a step S12) and the image of surroundings on the display 21, if any, is cleared (a step S13).

In a case where the image of surroundings needs to be displayed ("Yes" at the step S11), the image display system 100 judges whether the surrounding environment is so dark that lighting by the auxiliary lighting unit 6 is required (a step S14). Concretely, the image display system 100 judges whether illuminance that is a degree of brightness of the environment surrounding the vehicle 9, input from the illuminance sensor 84, is lower than a predetermined threshold. In a case where the illuminance input from the illuminance sensor 84 is higher than the predetermined threshold ("No" at the step S14), the image display system 100 turns off all the multiple auxiliary light sources 69 (a step S18) because lighting by the auxiliary lighting unit 6 is not required.

On the other hand, in a case where the illuminance input from the illuminance sensor 84 is lower than the predetermined threshold ("Yes" at the step S14), the image display system 100 then judges whether a photographed image actually captured by the photographing unit 5 is so dark that lighting by the auxiliary lighting unit 6 is required (a step S15). Concretely, an average brightness of the photographed image is input from the brightness adjuster 31 to the CPU 1 and the image display system 100 judges whether the average brightness of the photographed image is lower than a predetermined threshold. In a case where the average brightness of the photographed image is higher than the predetermined threshold ("No" at the step S15), the image display system 100 turns off all the multiple auxiliary light sources 69 (the step S18) because lighting by the auxiliary lighting unit 6 is not required.

On the other hand, in a case where the average brightness of the photographed image is lower than the predetermined threshold ("Yes" at the step S15), the area selector 12 selects one of the eleven lighting patterns (a step S16). In other words, based on a shift lever position input from the shift lever 81, driving speed input from the speedometer 82, and a lighting status of the driving lighting system input from the lighting control unit 83, one or more divided areas to be lit are selected out of the intended lighting area A. The conditions for selecting a lighting pattern is as described above according to each lighting pattern.

When a lighting pattern is selected, the light controller 13 commands the auxiliary lighting unit 6 to light the predetermined divided areas according to the selected lighting pattern. More specifically, the auxiliary light sources 69 corresponding to the divided areas selected to be lit are turned on and the other auxiliary light sources 69 are turned off (a step S17).

Next, with the auxiliary lighting unit 6 on, the photographing unit 5 takes photographs. Based on the photographed images captured by the photographing unit 5, the image converter 3 generates a composite image viewed from an arbitrary virtual viewpoint (a step S19). And then the generated composite image is output and displayed on the display 21 (a step S20). Even in a case where all the multiple auxiliary light sources 69 are turned off at the step S18, a composite image is similarly generated and displayed on the display 21 (the steps S19 and S20).

As explained above, the image display system 100 in the first embodiment can generate an image including the intended lighting area A that is the specified area surrounding the vehicle 9, and output the image on the display 21. And the auxiliary lighting unit 6 can selectively light one or more divided areas into which the intended lighting area A is divided. The divided areas to be lit are selected from multiple divided areas if needed, and the selected divided areas are lit by the auxiliary lighting unit 6. In this way, since a part of the intended lighting area A can be selectively lit, the entire intended lighting area A does not have to be constantly lit to display an image of the intended lighting area A. As a result, consumed power is effectively reduced, and degradation of the multiple auxiliary light sources 69 is considerably reduced, and thus durability of the multiple auxiliary light sources 69 can be improved.

Moreover, divided areas to be lit are selected based on the lighting status of the driving lighting system but the divided areas lit by the driving lighting system are not selected as the divided areas to be lit by the auxiliary lighting unit 6. In this way, no divided areas are lit both by the driving lighting system and the auxiliary lighting unit 6, which eliminates wasteful lighting and effectively reduces consumed power.

Moreover, the divided areas to be lit are selected according to a driving status of the vehicle 9, which allows effective reduction in consumed power because only the divided area necessary for driving are lit according to the driving status. For example, as is evident from comparison between the first lighting pattern (FIG. 9) and the third lighting pattern (FIG. 11) or between the first lighting pattern (FIG. 9) and the seventh lighting pattern (FIG. 15), fewer divided areas are lit when the vehicle 9 moves than when the vehicle 9 stops. In this way, by reducing the divided areas to be lit when the vehicle 9 moves than when the vehicle 9 stops, information of useless area is excluded from a displayed image. Therefore, a driver can pay attention only to information of necessary area and concentrate on driving without a great distraction from driving.

Since the auxiliary lighting unit 6 lights in a case of relatively dark surroundings of the vehicle 9, the auxiliary lighting unit 6 does not have to light in relatively bright surroundings of the vehicle 9. As a result, consumed power can be effectively reduced. In addition, since the auxiliary lighting unit 6 lights the divided areas in a case where a photographed image captured by the photographing unit 5 is relatively dark, the auxiliary lighting unit 6 does not have to light the divided areas in a case where the photographed image is relatively bright. As a result, consumed power can be effectively reduced, and degradation of the multiple auxiliary light sources 69 is considerably reduced, and thus durability of the multiple auxiliary light sources 69 can be improved.

2. Second Embodiment

Next, a second embodiment is explained. In an image display system of the second embodiment, a result detected by clearance sonar for detecting an object in surroundings of a vehicle 9 is input as signals, and divided areas to be lit by an auxiliary lighting unit 6 are selected according to the signals.

Figure 21:
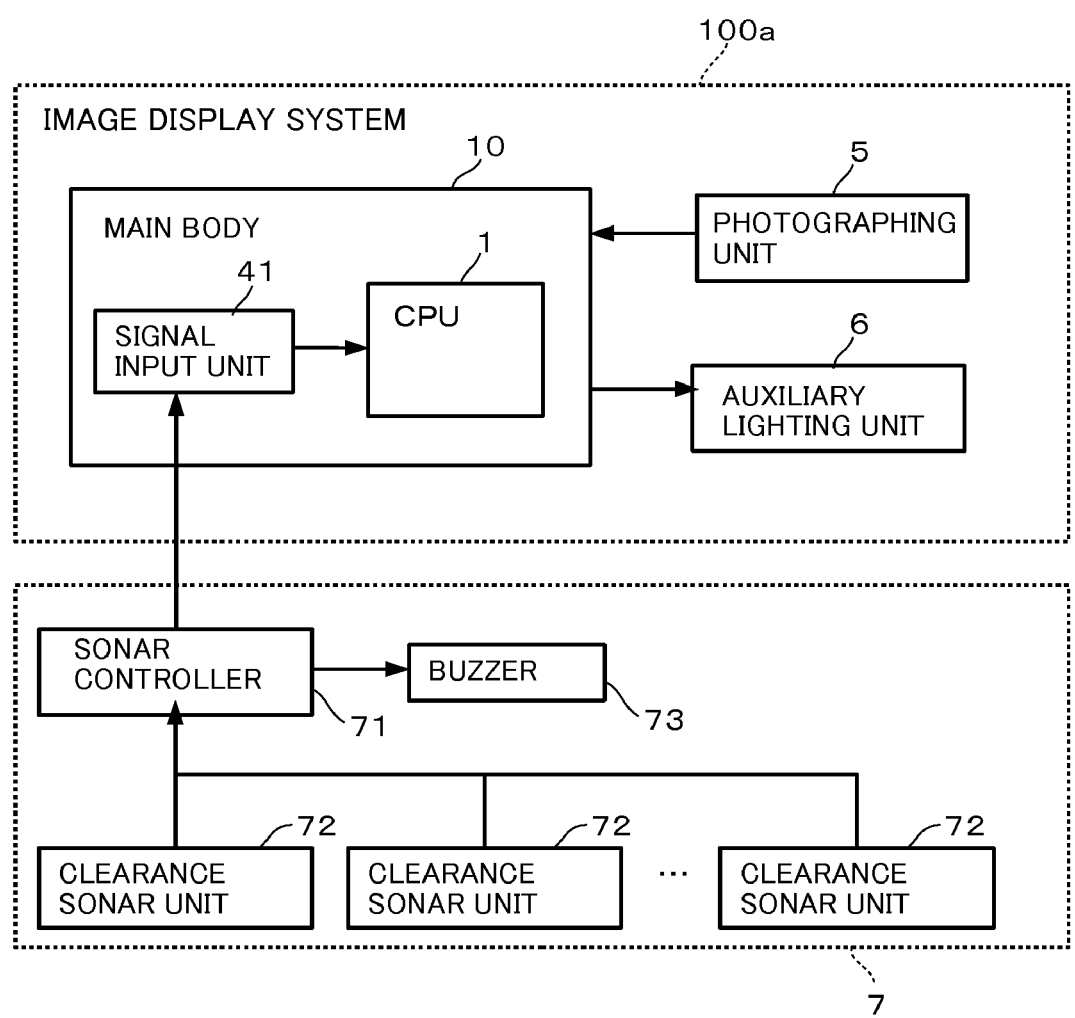
FIG. 21 is a block diagram of an image display system of a second embodiment.

FIG. 21 is a block diagram of an image display system 100*a* of the second embodiment. Like the image display system 100 of the first embodiment, the image display system 100*a* of the second embodiment includes a main body 10, a photographing unit 5, and an auxiliary lighting unit 6. Hardware composition of the image display system 100*a* is the same as the one of the image display system 100 of the first embodiment. However, a part of process performed by a CPU 1 of the main body 10 is different from the one by the CPU 1 of the main body 10 of the first embodiment. Therefore, differences from the first embodiment are mainly explained below.

On the vehicle 9 of the second embodiment, a sonar system 7 for detecting an object in the surroundings of the vehicle 9 is installed. A result detected by the sonar system 7 is input to the CPU 1 of the image display system 100*a* via a signal input unit 41.

The sonar system 7 includes a sonar controller 71 for controlling a sonar system, multiple clearance sonar units 72, and a buzzer 73 for producing an alarm sound in a cabin of the vehicle 9. The clearance sonar unit 72 measures a distance to an object by emitting ultrasonic waves and measuring time from the emission of the ultrasonic waves to reflection of the ultrasonic waves from the object. An object in the surroundings of the vehicle 9 is detected based on the distance. The result detected by the clearance sonar unit 72 is input into the sonar controller 71, an alarm sound according to the distance to the object is produced from the buzzer 73. Thus a driver can realize that there is the object in the surroundings of the vehicle 9.

Figure 22:
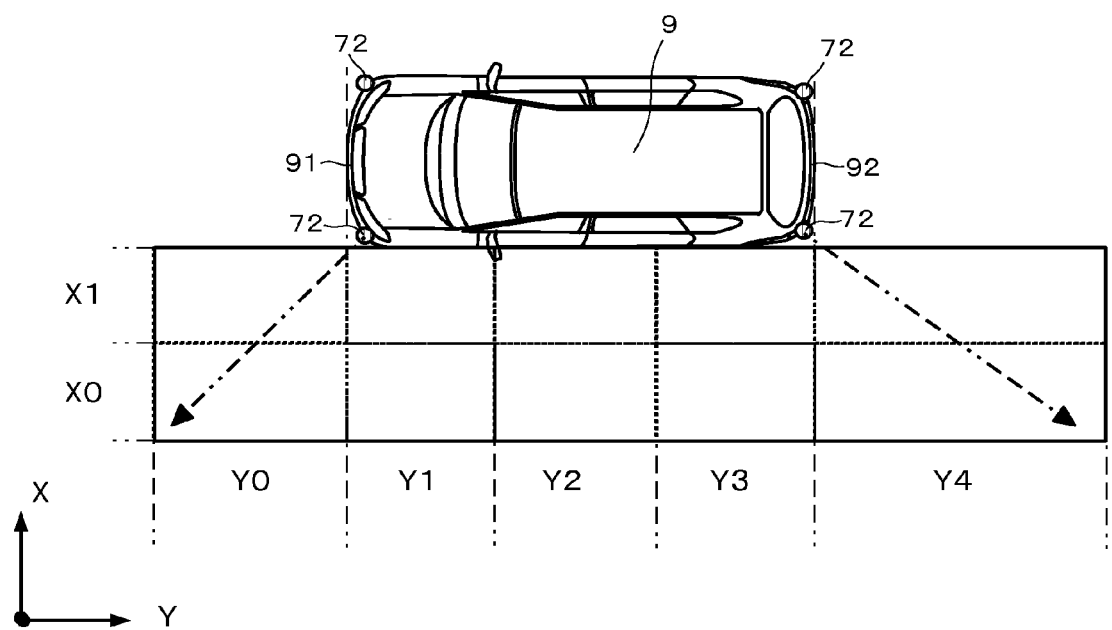
FIG. 22 shows positions of multiple clearance sonar units disposed on a vehicle.

FIG. 22 shows positions of the multiple clearance sonar units 72 disposed on the vehicle 9. The multiple clearance sonar units 72 are respectively disposed on the right and left ends of a front bumper 91 and on the right and left ends of a rear bumper 92. The clearance sonar units 72 disposed on the front bumper 91 emit ultrasonic waves to a frontward area Y0. On the other hand, the clearance sonar units 72 disposed on the rear bumper 92 emit ultrasonic waves to a backward area Y4. Therefore, the clearance sonar units 72 can detect an object in the frontward area Y0 or the backward area Y4.

In a case where the clearance sonar unit 72 detects an object, a position of the clearance sonar unit 72 that detects the object and a distance to the object are input to the CPU 1 of the image display system 100*a*. In the image display system 100*a*, an image of the surroundings of the vehicle 9 is displayed on a display 21 in a case where the clearance sonar unit 72 detects an object.

Figure 23:
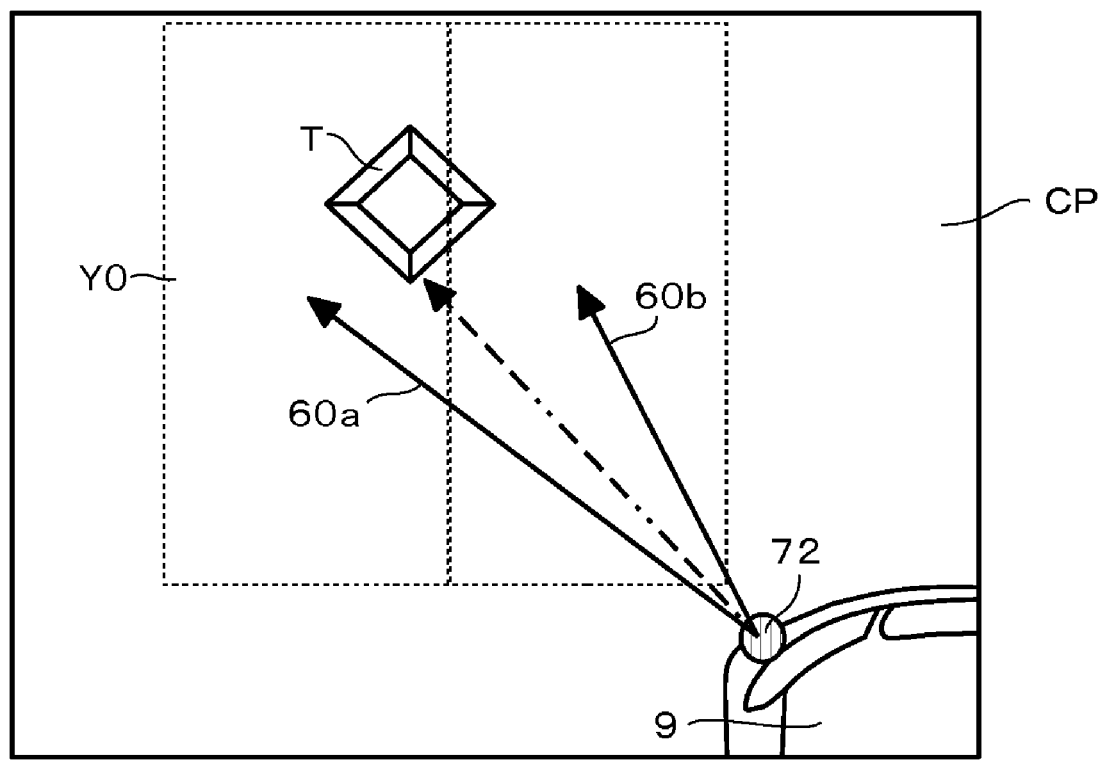
FIG. 23 shows an exemplary image displayed by an image display system.

FIG. 23 shows an exemplary image shown by the image display system 100*a*. An image CP shown in FIG. 23 is an image shown in a case where an object T is detected by the clearance sonar unit 72 disposed on the left end of the front bumper 91. In the image display system 100*a*, in a case where the clearance sonar unit 72 detects an object, a position of the object relative to the vehicle 9 is identified by the CPU 1 based on the position the clearance sonar unit 72 that detects the object and the distance from the clearance sonar unit 72 to the object. An image converter 3 determines a position of a virtual viewpoint toward the position of the object and an enlarged composite image of the object is generated to be displayed on the display 21.

Moreover, in a case of a relatively dark surrounding environment of the vehicle 9, divided areas corresponding to the position of the detected object are selected as the divided areas to be lit and the auxiliary lighting units 6 lights the divided areas where the object is detected. Since the object T is located in the frontward area Y0 in FIG. 23, the frontward area Y0 is set as the divided areas to be lit and lit by auxiliary light sources 60*a* and 60*b* of the auxiliary lighting unit 6. Thus, an image bright enough to show the object T can be captured even in the case of the relatively dark surrounding environment of the vehicle 9. The position of the virtual viewpoint for the composite image is determined so that the composite image can include the position of the object. In other words, in the image display system 100*a*, the divided areas to be lit are selected according to an area included in the composite image.

Figure 24:
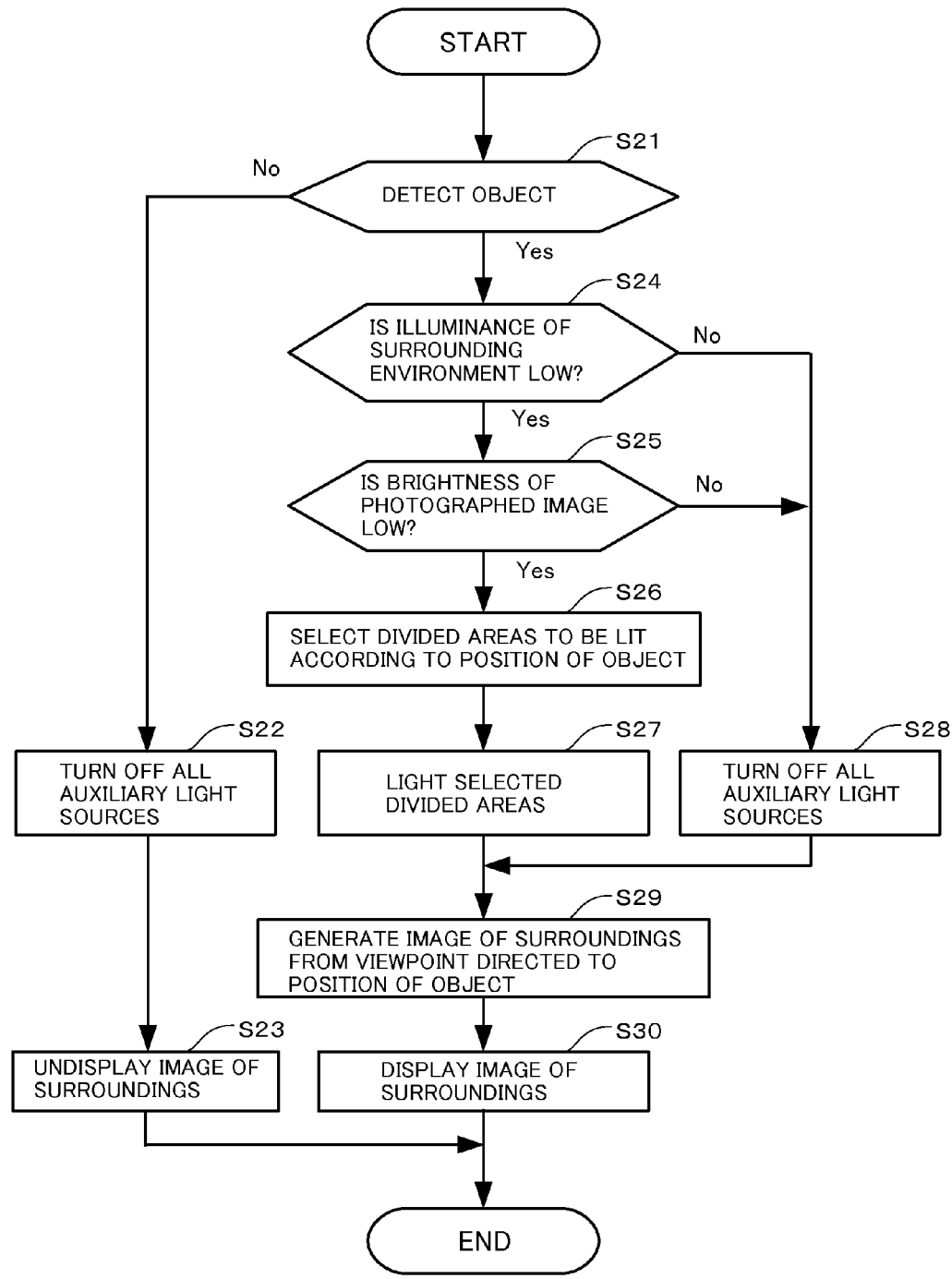
FIG. 24 shows a process flow of the image display system of the second embodiment.

FIG. 24 shows a process flow of the image display system 100*a*. This process is also repeatedly performed under control of the CPU 1 while the image display system 100*a* is running, and each process step is performed by functions of the CPU 1 unless otherwise mentioned.

First, based on signals input from the sonar system 7, the image display system 100*a* judges whether the clearance sonar unit 72 detects an object (a step S21). In a case where no object is detected ("No" at the step S21), all the multiple auxiliary light sources 69 are turned off (a step S22) and the image of surroundings of the vehicle 9 on the display 21, if any, is cleared (a step S23).

In a case where an object is detected ("Yes" at the step S21), the image display system 100a judges whether illuminance from an illuminance sensor 84 is lower than a predetermined threshold (a step S24). In a case where the illuminance from the illuminance sensor 84 is higher than the predetermined threshold ("No" at the step S24), all the auxiliary light sources 69 are turned off (a step S28). On the other hand, in a case where the illuminance from the illuminance sensor 84 is lower than the predetermined threshold ("Yes" at the step S24), the image display system 100a then judges whether average brightness of a photographed image is lower than a predetermined threshold (a step S25). In a case where the average brightness of the photographed image is higher than the predetermined threshold ("No" at the step S25), all the auxiliary light sources 69 are turned off (the step S28).

On the other hand, in a case where the average brightness of the photographed image is lower than the predetermined threshold ("Yes" at the step S25), a position of the object is identified based on a position of the clearance sonar unit 72 that detects the object and a distance from the clearance sonar unit 72 to the object. Then an area selector 12 selects divided areas corresponding to the position of the detected object as the divided areas to be lit (a step S26). A light controller 13 commands the auxiliary lighting unit 6 to light the selected divided areas (a step S27).

Next, the photographing unit 5 takes photographs with the auxiliary lighting unit 6 on, and the image converter 3 generates a composite image viewed from a virtual viewpoint based on the captured photographed images. At that time, the virtual viewpoint is disposed to be directed toward the position of the detected object, and a composite image showing an enlarged area where the object is detected is generated (a step S29). The generated composite image is output and displayed on the display 21 (a step S30).

As mentioned above, in the image display system 100a, of multiple divided areas, the divided areas corresponding to the position of the detected object are selected as the divided areas to be lit, based on the result detected by the sonar system 7 for detecting an object in the surroundings of the vehicle 9. As a result, even in the relatively dark surrounding environment, the driver can easily recognize the detected object.

By selecting the divided areas to be lit according to the area included in the composite image viewed from the virtual viewpoint, only the area necessary for the composite image can be lit and consumed power can be effectively reduced. In this embodiment, the position of the virtual viewpoint is determined according to the position of the detected object. However, a virtual viewpoint may be arbitrarily determined at a position unrelated to the detected object, and the divided areas to be lit may be selected according to the area included in the composite image viewed from the arbitrary virtual viewpoint.

3. Third Embodiment

Next, a third embodiment is explained. In this embodiment, functions of the main body 10 of the image display system 100 or 100a of the embodiments mentioned above may be separately implemented by multiple units. Functions of a main body 10 of the third embodiment are implemented by an image processing unit and a display unit.

Figure 25:
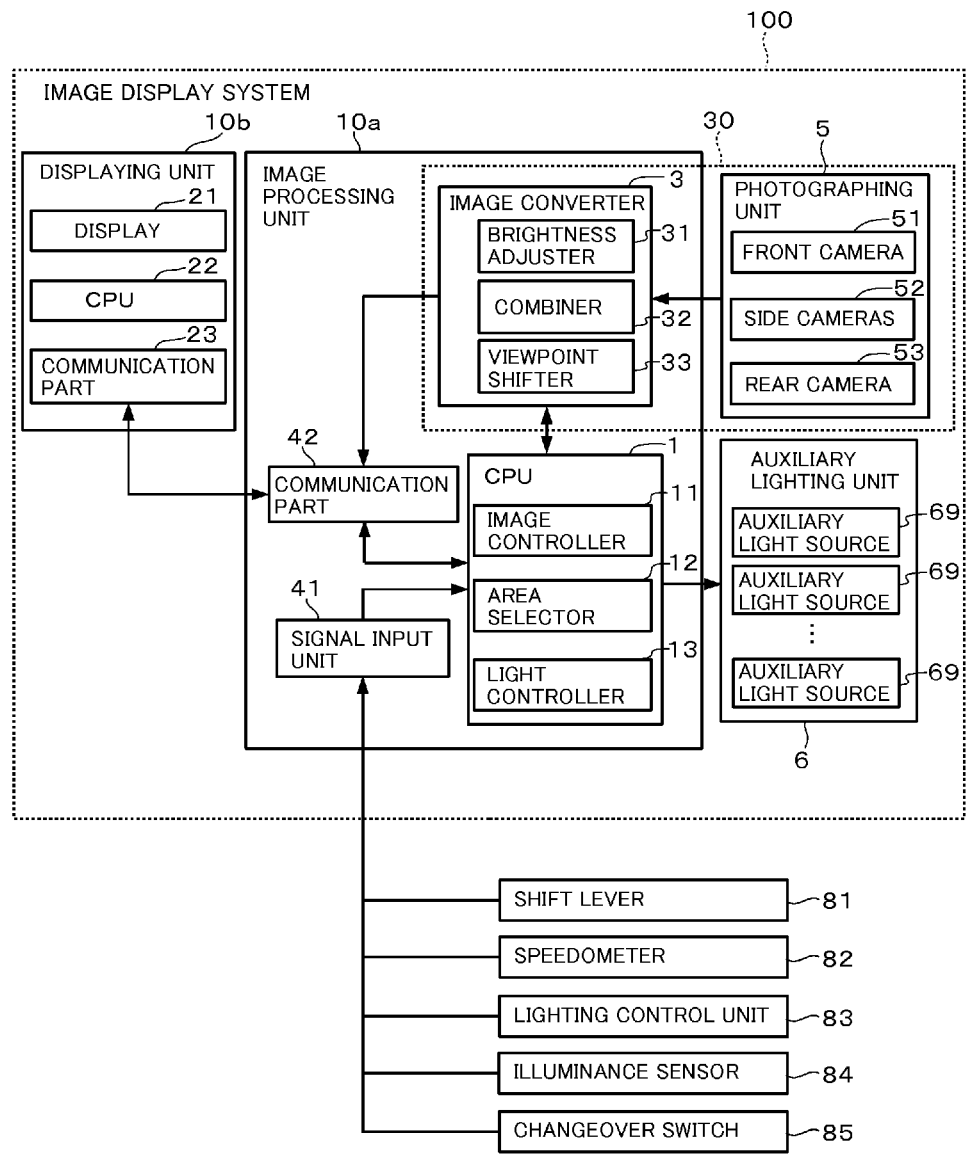
FIG. 25 is a block diagram of an image display system of a third embodiment.

FIG. 25 is a block diagram of an image display system 100b of the third embodiment. The image display system 100b of the third embodiment includes an image processing unit 10a and a displaying unit 10b, and the functions of the main body 10 of the first or second embodiment mentioned above are implemented by the image processing unit 10a and the displaying unit 10b. The displaying unit 10b includes a display 21 for displaying an image generated by the image processing unit 10a. Such a configuration enables the image processing unit 10a to be disposed at an arbitrary position of a vehicle 9 only with the displaying unit 10b disposed at a viewable position such as on an instrument panel.

The image processing unit 10a and the displaying unit 10b are communicably connected with each other and communicate with each other respectively via a communication part 23 and a communication part 42. The displaying unit 10b includes a CPU 22 as a controller, and operates based on signals from the image processing unit 10a. As a result, an image showing surroundings of the vehicle 9, generated by the image processing unit 10a, is displayed on the display 21 of the displaying unit 10b.

A CPU 1 of the image processing unit 10a has the same functions as the ones of the CPU 1 of the first or second embodiment mentioned above. However, a part of the functions of the CPU 1 may be performed by the CPU 22 of the displaying unit 10b. Moreover, a part or all of signals from various devices installed in or on the vehicle 9 may be input not to the image processing unit 10a but to the displaying unit 10b. As a result, for example, an area selector 12 can be implemented as a part of functions of the CPU 22 of the displaying unit 10b.

4. Other Embodiments

Hereinbelow, other embodiments are explained. Every embodiment explained above and below can be arbitrarily combined with others.

In the embodiments mentioned above, the shift lever 81, the speedometer 82, the lighting control unit 83, the illuminance sensor 84, the changeover switch 85, the sonar system 7, etc. are explained as external components of the image display system. However, a part or all of them may be included in the image display system.

Moreover, in the above explanations of the embodiments, the intended lighting area A that is lateral areas of the vehicle 9 is defined as the specific area of the surroundings of the vehicle 9, and multiple divided areas into which the specific area is divided are selectively lit. However, the specific area may not be limited to the lateral area of the vehicle 9 but an arbitrary area of the surroundings of the vehicle 9. However, it is advantageous to define the lateral areas as the specific area as mentioned in the above embodiments because an image of the lateral areas that are hard to be seen from a driver and hard to be lit by the driving lighting system can be displayed even in a case where the surroundings of the vehicle 9 is dark. In the embodiments mentioned above, both lateral areas at right and left sides of the vehicle 9 are defined as the specific area. However, the lateral area only at one side (for example, only at the side of passenger seat that tends to be a blind area from a driver) may be defined as the specific area.

Furthermore, in the embodiments mentioned above, one of the auxiliary light sources 69 lights a divided area. However, one of the auxiliary light sources 69 may light two or more divided areas by making optical axes of the auxiliary light sources 69 movable.

In addition, the conditions for selecting a lighting pattern described in the embodiments mentioned above are only examples and not limited to them. For example, in the third or other lighting patterns mentioned above, in a case of relative fast driving speed, only the frontward area of the vehicle 9 is lit. However, a backward area of the vehicle 9 may be also lit in order to prevent an accident such as an accident where a person is entangled in a back tire.

In the above explanations of the embodiments, each function is performed by software as a result of performance of arithmetic processing of a CPU in accordance with a program. However, a part of the functions may be performed by an electrical hardware circuit. Contrarily, a part of functions that are performed by a hardware circuit in the above explanation of the embodiments may be performed by software.

While the invention has been shown and described in detail, the foregoing description is in all aspects illustrative and not restrictive. It is therefore understood that numerous other modifications and variations can be devised without departing from the scope of the invention.

What is claimed is:

1. An on-vehicle lighting apparatus for providing light to assist in photographing of surroundings of a vehicle, the apparatus comprising:
    a lighting unit that selectively lights multiple divided areas into which a specific area of the surroundings of the vehicle is divided, the lighting unit having a plurality of first light sources;
    a first input unit that receives signals representing a lighting status of a driving lighting system used during driving of the vehicle, the driving lighting system lighting a part of the multiple divided areas and including a plurality of second light sources that are different from the plurality of first light sources; and
    a controller that selects one or more of the divided areas to be lit out of the multiple divided areas based on the lighting status of the driving lighting system and that commands the lighting unit to light the selected one or more divided areas, wherein the controller does not select, out of the multiple divided areas, divided areas that are being lit by the driving lighting system.

2. The on-vehicle lighting apparatus according to claim 1, further comprising
    a second input unit that receives signals representing a driving status of the vehicle and, wherein
    the controller selects the one or more divided areas to be lit based on the lighting status and the driving status.

3. The on-vehicle lighting apparatus according to claim 2, wherein
    the controller selects fewer divided areas to be lit when the vehicle is moving than when the vehicle is stopped.

4. The on-vehicle lighting apparatus according to claim 1, wherein
    the controller commands the lighting unit to light the one or more divided areas to be lit in a case where brightness in the surroundings of the vehicle is lower than a predetermined threshold.

5. The on-vehicle lighting apparatus according to claim 1, wherein
    the controller commands the lighting unit to light the one or more divided areas to be lit in a case where brightness of a photographed image captured by the photographing is lower than a predetermined threshold.

6. The on-vehicle lighting apparatus according to claim 1, wherein the specific area includes a lateral area of the vehicle.

7. The on-vehicle lighting apparatus according to claim 1, further comprising
    an image generating unit that photographs the surroundings of the vehicle and that generates an image including the specific area.

8. The on-vehicle lighting apparatus according to claim 7, wherein
    the image generating unit generates a composite image viewed from a virtual viewpoint based on multiple images obtained by photographing the surroundings of the vehicle with multiple cameras.

9. The on-vehicle lighting apparatus according to claim 7, further comprising
    a display unit that displays the image generated by the image generating unit.

10. The on-vehicle lighting apparatus according to claim 1, wherein the plurality of second light sources of the driving lighting system includes headlights, parking lights, tail lights, brake lights and backup lights of the vehicle.

11. An on-vehicle lighting apparatus for providing light to assist in photographing surroundings of a vehicle, the apparatus comprising:
    a lighting unit that selectively lights multiple divided areas into which a specific area of the surroundings of the vehicle is divided;
    an image generating unit that generates a composite image viewed from a virtual viewpoint based on multiple images obtained by photographing the surroundings of the vehicle with multiple cameras; and
    a controller that selects, out of the multiple divided areas, one or more divided areas to be included in the composite image and that commands the lighting unit to light only the selected one or more divided areas without lighting the divided areas that are not to be included in the composite image.

12. The on-vehicle lighting apparatus according to claim 11, wherein the specific area includes a lateral area of the vehicle.

13. The on-vehicle lighting apparatus according to claim 11, further comprising
    a display unit that displays the composite image generated by the image generating unit.

* * * * *